US010664949B2

United States Patent
Chalom et al.

(10) Patent No.: US 10,664,949 B2
(45) Date of Patent: May 26, 2020

(54) EYE CONTACT CORRECTION IN REAL TIME USING MACHINE LEARNING

(71) Applicant: Intel Corporation, Santa Clara, CA (US)

(72) Inventors: Edmond Chalom, Petach Tikvah (IL); Or Shimshi, Kiryat-Ono (IL)

(73) Assignee: Intel Corporation, Santa Clara, CA (US)

( * ) Notice: Subject to any disclaimer, the term of this patent is extended or adjusted under 35 U.S.C. 154(b) by 885 days.

(21) Appl. No.: 15/136,621

(22) Filed: Apr. 22, 2016

(65) Prior Publication Data

US 2017/0308992 A1    Oct. 26, 2017

(51) Int. Cl.
| | |
|---|---|
| *G06T 3/00* | (2006.01) |
| *G06K 9/46* | (2006.01) |
| *G06K 9/62* | (2006.01) |
| *G06K 9/00* | (2006.01) |
| *H04N 7/14* | (2006.01) |
| *G06K 9/66* | (2006.01) |

(52) U.S. Cl.
CPC ........ *G06T 3/0093* (2013.01); *G06K 9/00281* (2013.01); *G06K 9/00604* (2013.01); *G06K 9/00617* (2013.01); *G06K 9/4642* (2013.01); *G06K 9/4671* (2013.01); *G06K 9/6212* (2013.01); *G06K 9/6247* (2013.01); *G06K 9/6267* (2013.01); *G06K 9/6282* (2013.01); *G06K 9/66* (2013.01); *H04N 7/144* (2013.01); *H04N 7/147* (2013.01)

(58) Field of Classification Search
CPC ..................... G06F 3/0481; G06F 2203/04805
USPC ........................................................ 345/647
See application file for complete search history.

(56) References Cited

U.S. PATENT DOCUMENTS

| | | | |
|---|---|---|---|
| 6,714,234 B1 | 3/2004 | Hillis et al. | |
| 2003/0197779 A1* | 10/2003 | Zhang | H04N 7/144 348/14.16 |
| 2005/0089246 A1 | 4/2005 | Luo | |
| 2009/0238419 A1 | 9/2009 | Steinberg et al. | |
| 2012/0219180 A1 | 8/2012 | Mehra | |

(Continued)

FOREIGN PATENT DOCUMENTS

| | | |
|---|---|---|
| KR | 1020140076949 | 6/2014 |
| KR | 1020150113795 | 10/2015 |

(Continued)

OTHER PUBLICATIONS

Song, F., Tan, X., Liu, X., Chen, S.: Eyes closeness detection from still images with multi-scale histograms of principal oriented gradients. Pattern Recogn. 47(9), 2825-2838 (2014).*

Karaaba, M. F., Wiering, M. A., and Schomaker, L. (2014). Machine Learning for Multi-View Eye-Pair Detection. Engineering Applications of Artificial Intelligence, 33(0):69-79.*

(Continued)

*Primary Examiner* — Jin Ge

(74) *Attorney, Agent, or Firm* — Green, Howard & Mughal LLP.

(57) ABSTRACT

Techniques related to eye contact correction to provide a virtual user gaze aligned with a camera while the user views a display are discussed. Such techniques may include determining and reducing histogram of oriented gradient features for an eye region of a source image to provide a feature set, applying a pretrained classifier to the feature set to determine a motion vector field for the eye region, and warping and inserting the eye region into the source image to generate an eye contact corrected image.

12 Claims, 11 Drawing Sheets

(56) References Cited

U.S. PATENT DOCUMENTS

| | | | |
|---|---|---|---|
| 2013/0142401 A1* | 6/2013 | Nomoto | G06K 9/6267 |
| | | | 382/118 |
| 2013/0222644 A1* | 8/2013 | Son | H04N 5/23219 |
| | | | 348/239 |
| 2014/0016871 A1 | 1/2014 | Son et al. | |
| 2015/0009277 A1 | 1/2015 | Kuster et al. | |
| 2015/0278599 A1* | 10/2015 | Zhang | G06K 9/00604 |
| | | | 348/78 |
| 2015/0339512 A1* | 11/2015 | Son | G06K 9/46 |
| | | | 348/78 |
| 2016/0026847 A1 | 1/2016 | Vugdelija et al. | |
| 2016/0070952 A1* | 3/2016 | Kim | G06K 9/00208 |
| | | | 382/118 |
| 2016/0104053 A1 | 4/2016 | Yin et al. | |
| 2016/0132720 A1* | 5/2016 | Klare | G06K 9/00288 |
| | | | 382/118 |
| 2016/0140383 A1* | 5/2016 | Kim | G06K 9/00234 |
| | | | 382/118 |
| 2016/0307069 A1* | 10/2016 | Wu | G06K 9/6255 |
| 2016/0315886 A1* | 10/2016 | Huang | H04L 12/1859 |

FOREIGN PATENT DOCUMENTS

| | | |
|---|---|---|
| WO | 9926126 | 5/1999 |
| WO | 2010148250 | 12/2010 |

OTHER PUBLICATIONS

Tariq Iqbal, "A Robust Real Time Eye Tracking and Gaze Estimation System Using Particle Filters", The University of Texas at El Paso, Aug. 2012.*

Non-Final Office Action, dated Oct. 6, 2016, for U.S. Appl. No. 15/136,618.

International Search Report and Written Opinion dated May 24, 2017, for PCT Patent Application No. PCT/US17/21442.

Kononenko et al., "Learning to look up: Realtime monocular gaze correction using machine learning", 2015 IEEE Conference on Computer Vision and Pattern Recognition (CVPR), Jun. 7-12, 2015, pp. 4667-4675, ISSN: 1063-6919, IEEE, Boston, MA.

International Preliminary Report on Patentability for International Patent Application No. PCT/US17/21442, dated Nov. 1, 2018.

* cited by examiner

EYE CONTACT CORRECTION IN REAL TIME USING MACHINE LEARNING

BACKGROUND

In videotelephony or video conferencing applications on laptops or other devices, the camera capturing video of the user and the display providing video of the person or people the user is speaking to may be offset. For example, the camera may be mounted above the display. As a result, the participants in the video call may not be able to simultaneously look at both the screen (to see the other participant) and the camera (which is desirable to make good, natural contact with the other participant).

Current techniques for correcting such eye contact correction problems are deficient. For example, current techniques may not be fast enough to support real time implantation, may require special additional camera hardware such as depth cameras or stereo cameras, or may not be robust enough in terms of quality. It is with respect to these and other considerations that the present improvements have been needed. Such improvements may become critical as the implementation of videotelephony in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
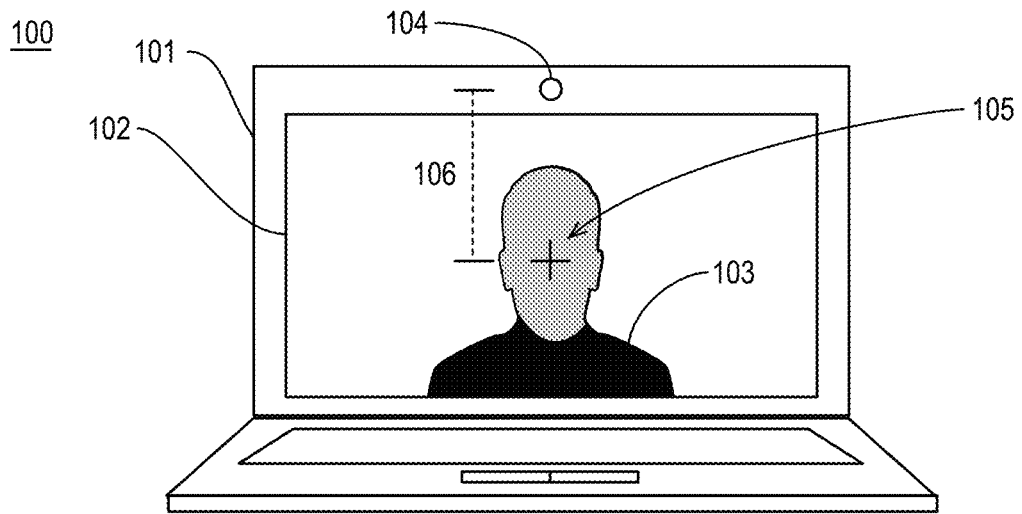
FIG. 1 illustrates an example setting for providing eye contact correction.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to eye contact correction.

As described above, in videotelephony or video conferencing applications on laptops or other devices such as mobile devices, the camera capturing video of the user and the display providing video of the person or people the user is speaking to may be offset, which may cause an undesirable and unnatural presentment of the user such that the user is not looking at the people to whom they are speaking. For example, the offset between the camera and the display may cause a dilemma for the user such that they must choose between looking at the display (and cause their presentment to the user to whom they are speaking to appear that they are looking away) and looking at the camera (and not at the user to whom they are speaking to). The techniques discussed herein may provide real time eye contact correction (or gaze correction) using machine learning in a cameral image signal processing unit for applications such as videotelephony, video conferencing, or the like.

As discussed herein, embodiments may include a training component (e.g., performed offline) and a real time component (e.g., performed during implementation or run time) that provides eye contact correction. In the offline training component, a database of faces with a known gaze angle may be used to train a machine learning system that learns a model (e.g., a pretrained classifier such as a random forest) that may be used to predict motion vectors (e.g. a motion vector field) that may adjust the input (e.g., having an uncorrected eye region) image to a desired output (e.g., having corrected eye contact) image while running in real time. Such techniques may include determining features (e.g., a feature set) corresponding to uncorrected eye regions and determining motion vectors corresponding to the features using a pretrained classifier such as an optimal random forest tree search. The motion vector field may be used to warp the eye region to generate the desired output image having corrected eye contact. Such techniques may provide improved corrected eye images, robustness (e.g. robust to local illumination changes), real time capability (e.g., faster operation), and flexibility (e.g., to train for various gaze angle corrections depending on relative positioning of the camera and display in the implementing device).

Embodiments discussed herein may provide for an eye contact corrected image from a source image such that the user may look at the display and the eye contact corrected image will correct the user's eye contact such that the eye contact corrected image provides an appearance that the user is looking at the camera. Such techniques may provide the advantage of the user being able to view the user to whom they are speaking while providing the appearance of natural eye contact. For example, the eye contact corrected image may be one image of a video sequence of images or frames that may be encoded and transmitted from a local device (e.g., of the user) to a remote device (e.g., of the user to whom the user of the local device is speaking).

In some embodiments, a source image may be obtained via a camera at a local device. Face detection and face landmark detection may be provided on the source image to detect faces and landmarks of such faces such as landmarks corresponding to eyes or eye regions. The source image may be cropped to generate eye regions based on the eye landmarks and the eye regions may be warped and reinserted into the source image to provide the eye contact corrected image. As discussed, such techniques may be provided on a sequence of images or frames and the sequence may be encoded and transmitted. In some embodiments, histogram of oriented gradient features may be determined for the eye region(s) of the source image and the histogram of oriented gradient features may be reduced (e.g., the dimensionality of the histogram of oriented gradient features may be reduced) to provide a feature set corresponding to each eye region of the source image. For example, the histogram of oriented gradient features may be reduced by applying principal component analysis having pretrained scaling and weighting factors to the histogram of oriented gradient features. A pretrained classifier may be applied to the feature sets to determine a motion vector field for each eye region of the source image and the eye region(s) of the source image may be warped based on the motion vector field(s) and integrated into the source image (e.g., into the remaining, non-eye region portion of the source image) to generate the eye contact corrected image. For example, the pretrained classifier may be a pretrained random forest classifier.

In some embodiments, during a training phase of the principal component analysis and/or the pretrained classifier, training may be performed based on a training set of images having known gaze angle difference therebetween. For example, first images of pairs in the training set and second images of the pairs may have a known gaze angle difference therebetween. During training, the training set images may be cropped to eye regions and the eye regions may be aligned to provide pairs of training eye region images. Based on the pairs of training eye region images, a likelihood map may be generated for each pixel of each of the first images of the pairs of training eye region images such that the likelihood map includes a sum of absolute differences (SAD) for each of multiple candidate motion vectors corresponding to the pixel. For example, for a particular pixel of an eye region of a first image, candidate motion vectors may be defined and a sum of absolute differences may be determined for each of the candidate motion vectors by comparing pixels around the particular pixel (e.g., a window) with a window in the eye region of the second image offset by the corresponding motion vector.

Furthermore, training stage histogram of oriented gradient features may be determined for the first images of the pairs of training eye region images and principal component analysis may be applied to reduce the training stage histogram of oriented gradient features to training stage feature sets corresponding to the first images of the pairs of training eye region images. Such principal component analysis may determine or provide pretrained scaling and weighting factors of the principal component analysis. For example, the training stage histogram of oriented gradient features determination may be analogous to the histogram of oriented gradient features determination to be performed in the implementation phase and the trained principal component analysis may also be applied in the implementation phase to reduce the histogram of oriented gradient features for an eye region to a feature set corresponding to the eye region.

Based on the likelihood maps and the feature sets for the eye regions in the training set, the pretrained classifier may be trained such that the pretrained classifier determines an optimal motion vector field based on the feature set during the implementation phase. As discussed, the pretrained classifier may be a pretrained random forest classifier. In such embodiments, each leaf of the tree of the random forest classifier may represent a likelihood map (e.g., a SAD map) for every pixel in the eye region and, at each branch of the tree, the training process may minimize the entropy between the likelihood maps that have arrived at the branch. The random forest classifier may include any suitable characteristics. In some embodiments, the random forest classifier may have about 4 to 8 trees having about 6 to 7 levels each.

As discussed, during the implementation phase, a feature set may be determined for an eye region of a source image and the pretrained classifier may be applied to the eye region to generate a motion vector field corresponding to the eye region. The motion vector field may be used to warp the eye region and the warped eye region may be integrated into the source image to generate an eye contact corrected image.

FIG. 1 illustrates an example setting 100 for providing eye contact correction, arranged in accordance with at least some implementations of the present disclosure. As shown, setting 100 may include a device 101 having a display 102 and a camera 104 operated by a user (not shown) to have a videotelephony session with a remote user 103. In the example of FIG. 1, device 101 is illustrated as a laptop computer. However, device 101 may include any suitable form factor device having display 102 and camera 104. For example, device 101 may be a camera, a smartphone, an ultrabook, a tablet, a wearable device, a monitor, a desktop computer, or the like. Furthermore, although discussed with respect to videotelephony or video conferencing, the discussed eye contact correction techniques may be provided in any suitable context.

During videotelephony or the like, images and/or video of the user of device 101 may be captured by camera 104 and, as shown, remote user 103 may be presented by display 102. During videotelephony, the user of device 101 may desire to look at a location 105 of remote user 103 (e.g., such that location 105 corresponds to the eyes of remote user 103) while images are being captured by camera 104. As shown, location 105 and camera 104 may have an offset 106 therebetween. As discussed, it may be desirable to alter the images and/or video of the user (not shown) as captured by camera 104 such that eye regions of the captured images and/or video frames may be warped to appear to look at or gaze upon camera 104. In the illustrated example, offset 106 is a vertical offset between camera 104 mounted above display 102. However, camera 104 and display 102 may have any relative position therebetween. For example, the relative position between camera 104 and display 102 may be a vertical offset with camera above display (as shown), a vertical offset with camera below display, a horizontal offset with camera left of display, a horizontal offset with camera right of display, or any diagonal offset between camera and display (e.g., camera above and to the right of display) with the camera fully outside of the boundary of the display or within a boundary in one direction (e.g., camera 104 may be moved from a central position of display 102 to a position off center but still within an edge of display 102).

Figure 2:
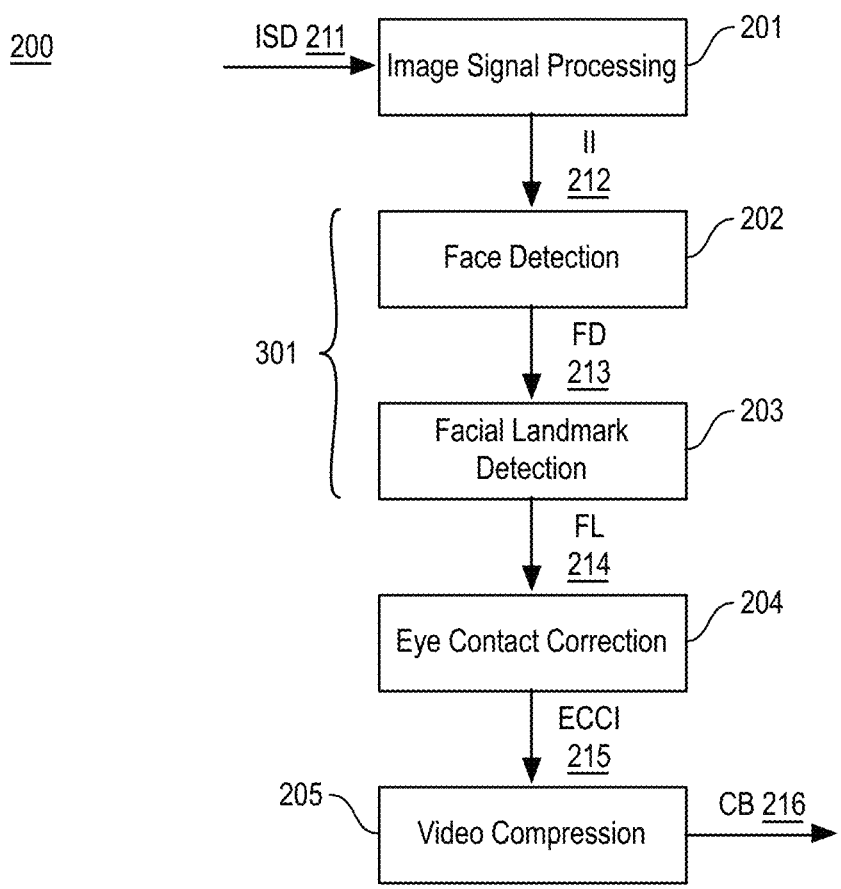
FIG. 2 illustrates an example system for providing eye contact correction.
Figure 3:
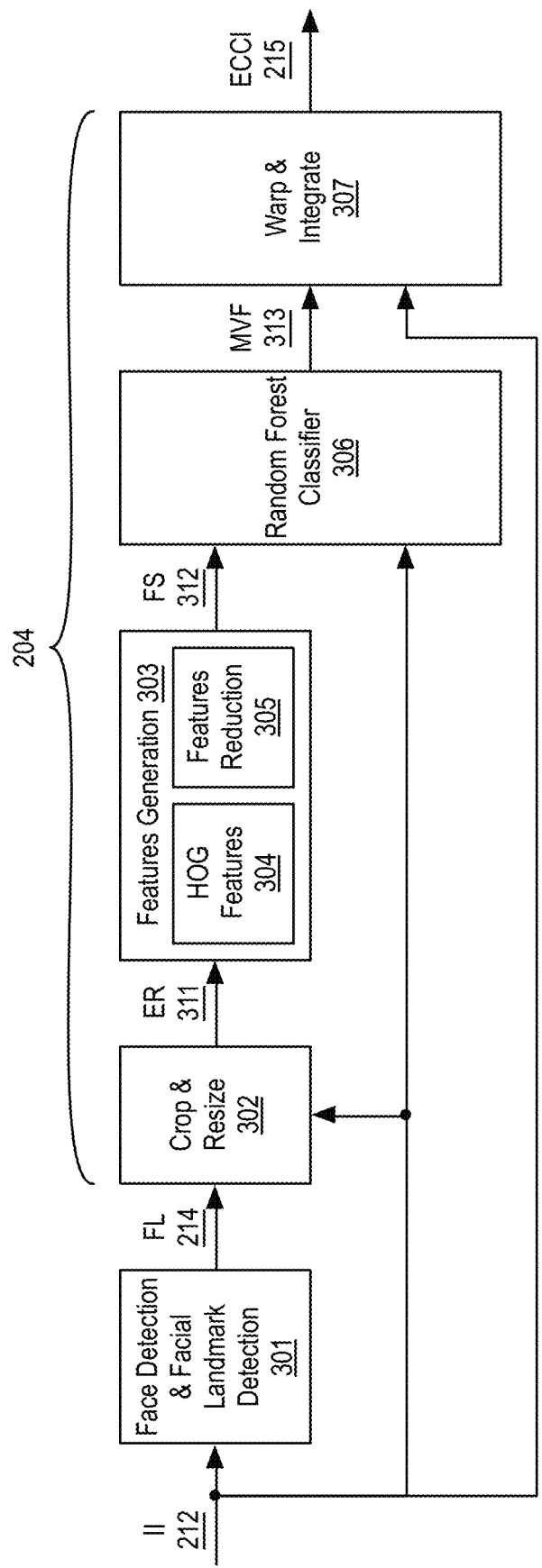
FIG. 3 illustrates an example eye contact correction module for providing eye contact correction.

FIG. 2 illustrates an example system 200 for providing eye contact correction, arranged in accordance with at least some implementations of the present disclosure. As shown in FIG. 2, system 200 may include an image signal processing module 201, a face detection module 202, a facial landmark detection module 203, an eye contact correction module 204, and a video compression module 205. As shown, in some embodiments, face detection module 202 and facial landmark detection module 203 may be part of a face detection and facial landmark detection module 301 (as illustrated in FIG. 3), which may provide face detection and facial landmark detection. System 200 may be implemented via any suitable device such as device 101 and/or, for example, a personal computer, a laptop computer, a tablet, a phablet, a smart phone, a digital camera, a gaming console, a wearable device, a display device, an all-in-one device, a two-in-one device, or the like. For example, system 200 may provide an image signal processing pipeline that may be implemented in hardware, software, or a combination thereof. As discussed, system 200 may provide for eye contact (or gaze) correction for videotelephony, video conferencing, or the like in real time to obtain natural looking corrected images and/or video. System 200 may use known scene geometry (e.g., relative positioning of camera 104 and display 102 as discussed with respect to FIG. 1) and machine learning techniques to provide real time, high quality eye contact correction.

As shown, image signal processing module 201 may receive image source data (ISD) 211. Image source data 211 may include any suitable image data such as image data from an image sensor (not shown) or the like. Image signal processing module 201 may process image source data 211 to generate input image (II) 212. Image signal processing module 201 may process image source data 211 using any suitable technique or techniques such as demosaicing, gamma correction, color correction, image enhancement, or the like to generate input image 212. Input image 212 may be in any suitable color space and may include any suitable image data. As used herein, the term image may include any suitable image data in any suitable context. For example, an image may be a stand-alone image, an image of a video sequence of images, a frame of video or the like. Input image 212 may be characterized as a source image, an image, a frame, a source frame, or the like.

Input image 212 may be provided to face detection module 202, which may determine whether input image 212 has any faces and, if so, determine the location of such faces. Face detection module 202 may perform such face detection using any suitable technique or techniques to generate face detection data (FD) 213, which may include any suitable data or data structure representing one or more faces in input image 212. For example, face detection data 213 may provide the location and size of a boundary box corresponding to a face detected in input image 212. Face detection data 213 and/or input image 212 or portions thereof may be provided to facial landmark detection module 203, which may determine facial landmarks corresponding to the face or faces detected by to face detection module 202. Facial landmark detection module 203 may determine such facial landmarks (e.g., landmarks corresponding to eyes, a nose, a mouth, etc.) using any suitable technique or techniques to generate facial landmarks (FL) 214, which may include any suitable data or data structure representing facial landmarks within input image 212. For example, facial landmarks 214 may include locations of facial landmarks and a corresponding descriptor (e.g., the face part to which the landmark corresponds) for the facial landmarks.

As shown, facial landmarks 214 and/or input image 212 or portions thereof may be provided to eye contact correction module 204, which may generate an eye contact corrected image (ECCI) 215 corresponding to input image 212. Eye contact correction module 204 may generate eye contact corrected image 215 using techniques discussed further herein with respect to FIG. 3. As shown, eye contact corrected image 215 or a sequence of eye contact corrected images may be provided to video compression module 205, which may provide image and/or video compression to eye contact corrected image 215 or a sequence of eye contact corrected images to generate compressed bitstream (CB) 216. Video compression module 205 may generate compressed bitstream 216 using any suitable technique or techniques such as video encode techniques. In some examples, compressed bitstream 216 may be a standards compliant bitstream. For example, compressed bitstream 216 may be compliant with the H.264/MPEG-4 Advanced Video Coding (AVC) standard, the High Efficiency Video Coding (HEVC) standard, or the like. Compressed bitstream 216 may be transmitted to a remote device (e.g., a device remote to device 101 as discussed with respect to FIG. 1) for presentment to a user of the remote device. For example, compressed bitstream 216 may be packetized and transmitted to the remote device, which may re-assemble compressed bitstream 216 and decode compressed bitstream 216 to generate image(s) for presentment to the user of the remote device.

FIG. 3 illustrates an example eye contact correction module 204 for providing eye contact correction, arranged in accordance with at least some implementations of the present disclosure. As shown in FIG. 2, eye contact correction module 204 may be provided as a portion of system 200 to provide eye contact correction. As shown in FIG. 3, input image 212 may be received by face detection and facial landmark detection module 301, which as discussed with respect to FIG. 2 may include face detection module 202 and facial landmark detection module 203. As shown, face detection and facial landmark detection module 301 may receive input image 212 and face detection and facial landmark detection module 301 may provide facial landmarks 214 as discussed herein. As shown in FIG. 3, eye contact correction module 204 may include a crop and resize module 302, a features generation module 303 that may include a histogram of oriented gradients (HOG) features module 304 and a features reduction module 305, a random forest classifier 306, and a warp and integrate module 307. For example, eye contact correction module 204 may receive facial landmarks 214 and input image 212 and eye contact correction module 204 may generate eye contact corrected image 215.

Figure 4:
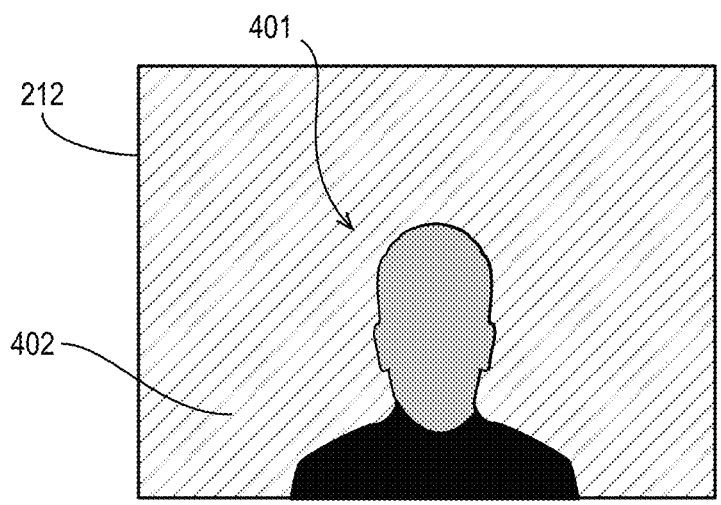
FIG. 4 illustrates an example input image.

FIG. 4 illustrates an example input image 212, arranged in accordance with at least some implementations of the present disclosure. As shown in FIG. 4, input image 212 may include a user 401 and a background 402. For example, image source data 211 may be captured by camera 104 and image source data 211 may be processed by image signal processing module 201 to generate input image 212. Although not shown in FIG. 4, user 401 may have eyes having an unnatural gaze such that instead of looking at camera 104, user 401 is looking at display 102 (please refer to FIG. 1), which may give the appearance of user 401, if received by a remote user, as looking down and away instead of at the remote user (please refer to FIG. 6).

Returning to FIG. 3, input image 212 may be received by face detection and facial landmark detection module 301, which as discussed, may provide face detection and facial landmark detection using any suitable technique or techniques.

Figure 5:
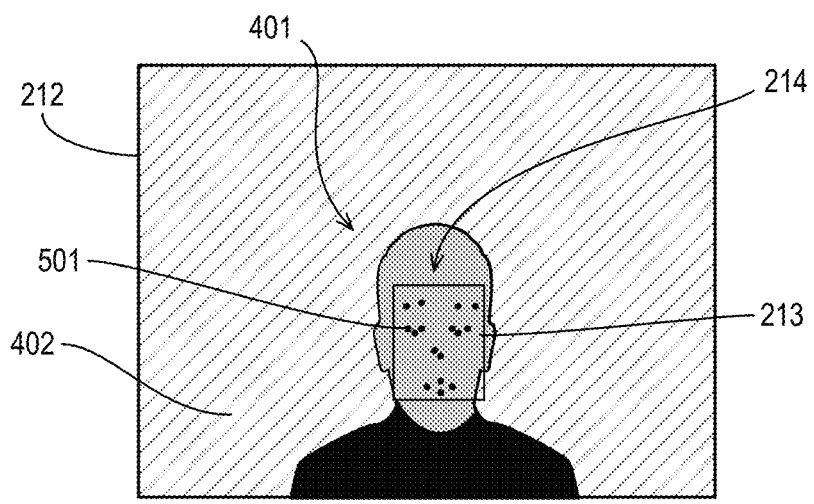
FIG. 5 illustrates example face detection data and example facial landmarks.

FIG. 5 illustrates example face detection data 213 and example facial landmarks 214, arranged in accordance with at least some implementations of the present disclosure. As shown in FIG. 5, face detection and facial landmark detection module 301 may provide face detection to generate face detection data 213, which may provide a boundary box or the like around a detected face region of user 401. Furthermore, face detection and facial landmark detection module 301 may provide facial landmarks 214, which may provide locations and, optionally, corresponding descriptors for detected facial landmarks of user 401. For example, facial landmarks 214 may include eye landmarks 501 characterized by locations within input image 212 and a descriptor or the like indicating they correspond to a detected eye of user 401.

Returning again to FIG. 3, as shown, crop and resize module 302 may receive facial landmarks 214 and input image 212 and crop and resize module 302 may generate eye regions 311 using any suitable technique or techniques. For example, input image 212 may be cropped to generate one or more eye regions 311 such that eye regions 311 include all or most eye landmarks corresponding to a detected eye and, optionally, a buffer region around the outer most eye landmarks in the horizontal and vertical directions. In an embodiment, crop and resize module 302 may crop input image 212 such that eye regions 311 each have a fixed (e.g., predetermined) size.

Figure 6:
FIG. 6 illustrates an example eye region.

FIG. 6 illustrates an example eye region 311, arranged in accordance with at least some implementations of the present disclosure. As shown in FIG. 6, eye region 311 may be a cropped portion of input image 212 including an eye of user 401. Also, as shown, eye region 311 may include a user eye that, if received by a remote user would not make eye contact with the remote user (as may be expected).

Returning to FIG. 3, eye regions 311 may include any number of eye regions for any number of users. In an expected implementation, eye regions 311 may include two eye regions for a single user 401. However, eye regions 311 may include a single eye region, multiple eye regions corresponding to multiple users, or the like.

With continued reference to FIG. 3, features generation module 303 may receive eye regions 311 and features generation module 303 may generate feature sets (FS) 312 such that each feature set of feature sets 312 corresponds to an eye region of eye regions 311. In an embodiment, features generation module 303 may include histogram of oriented gradients features module 304, which may generate or determine histogram of oriented gradient features for each eye region of eye regions 311. Such histogram of oriented gradient features may be generated using any suitable technique or techniques. For example, counts of occurrences of gradient orientations in localized portions of each eye region of eye regions 311 (e.g., for localized portions corresponding to each pixel), the counts may be binned into histograms, and the histogram of oriented gradient features may be a concatenation of the histograms. In an embodiment, the histogram of oriented gradient features may include a feature size of the width (in pixels) of the eye region by the height (in pixels) of the eye region by a number of implemented orientations. For example, for eye regions 311 of 50×60 pixels and 8 orientations, the full histogram of oriented gradient features size may be 50×60×8=24,000 features.

The histogram of oriented gradient features generated by features generation module 303 may be reduced by features reduction module 305. The histogram of oriented gradient features may be reduced using any suitable technique or techniques. Reducing the histogram of oriented gradient features may be characterized as reducing the dimensionality of histogram of oriented gradient features, reducing the number of features from the histogram of oriented gradient features, or the like. In an embodiment, the histogram of oriented gradient features may be reduced using principal component analysis (PCA) techniques. Such component analysis techniques may include converting the histogram of oriented gradient features to feature sets 312 such that feature sets 312 are linearly uncorrelated variables derived from the histogram of oriented gradient features. For example, principal component analysis techniques may be applied such that the principal component analysis includes pretrained scaling and weighting factors determined during a training phase, as is discussed with respect to FIG. 8 and elsewhere herein. Feature sets 312 may include any suitable data or data structure representative of compressed or condensed features based on the histogram of oriented gradient features. In an embodiment, feature sets 312 may include a feature set corresponding to each eye region of eye regions 311. Feature sets 312 may include a feature sets of any size such as, for example, about 100 features or the like.

As shown, feature sets 312 and input image 212 may be received by random forest classifier 306. As discussed further herein, random forest classifier 306 may be a pretrained classifier that applies the pretrained classifier to a feature set of feature sets 312 to generate a corresponding (and optimal) motion vector field 313. Although illustrated with respect to random forest classifier 306, any suitable pretrained classifier may be applied such as, for example, a decision tree learning model, a kernel random forest model, or the like. Random forest classifier 306 may receive feature sets 312 and, for each feature set of feature sets 312, apply the random forest classifier such that the feature set traverses branches of the forest based on decisions at each branch until a leaf is reached such that the leaf corresponds to or provides a motion vector field for the feature set. For example, motion vector fields 313 may include a motion vector field for each feature set of feature sets 312 based on application of random forest classifier 306 to each feature set.

Motion vector fields 313 and input image 212 may be received by warp and integrate module 307, which may warp eye regions 311 based on motion vector fields 313 and integrate the warped eye region or regions into input image 212. For example, motion vector fields 313 may be applied to eye regions 311 by determining, for each pixel location of eye regions 311 a warped pixel value as a pixel value corresponding to pixel value as indicated by the motion vector for that pixel. The warped eye regions may then replace eye regions 311 in input image 212 (e.g., the warped eye regions may be integrated into the remaining portion of input image 212) to generate eye contact corrected image 215.

Figure 7:
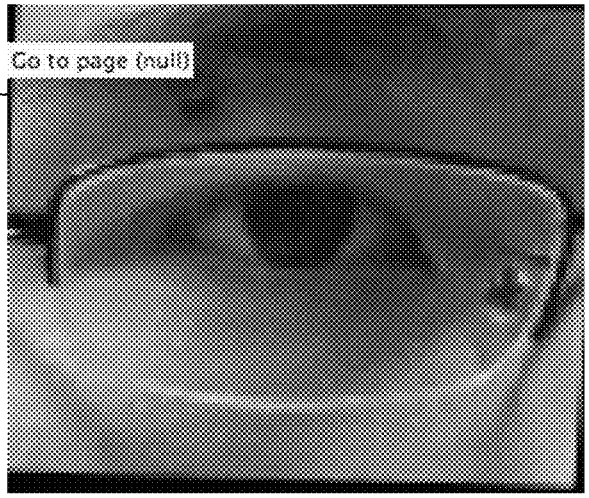
FIG. 7 illustrates an example corrected eye region.

FIG. 7 illustrates an example corrected eye region 701, arranged in accordance with at least some implementations of the present disclosure. As shown in FIG. 7, corrected eye region 701 may have a corrected gaze with respect to eye region 311 of FIG. 6 such that the gaze appears to be looking at recipient of corrected eye region 701. As discussed, corrected eye region 701 (e.g., a warped eye region) may be integrated into a final eye corrected image, which may be encoded and transmitted to a remote user for presentment.

Returning to FIG. 3, any number of eye contact corrected images 215 may be generated such as a video sequence of eye contact corrected images 215. The techniques discussed herein may provide for high quality eye contact correction in real time. For example, the discussed processing as performed by system 200 may be performed at a rate such that videotelephony, video conferencing, or the like may be performed in real time between users.

With reference to FIG. 1, a user of device 101 (not shown) and user 103 at a remote device (not shown) may experience a videotelephony application, a video conferencing application, or the like that compensates for offset 106 between location 105 and camera 104 by adjusting the gaze of either or both users. Furthermore, with respect to device 101, features generation module 303 and/or random forest classifier 306 may rely on pretraining based on offset 106. For example, as discussed further below, training images used to train features reduction module 305 and/or random forest classifier 306 may be selected such that they match or closely approximate offset 106. For example, if offset 106 provides an approximate offset of 10° (e.g., a 10° angle between a line from a user's eyes to location 105 and a second line from the user's eyes to camera 104), training images having an approximate offset of 10° may be used to train features reduction module 305 and/or random forest classifier 306.

Furthermore, with further reference to system 200, system 200 includes a single eye contact correction module 204 trained for a single orientation or relative position between camera 104 and display 102. In other embodiments, system 200 may include multiple contact correction modules or contact correction module 204 may be capable of implementing eye contact correction for multiple orientations or relative positions between camera 104 and display 102. For example, device 101 may include a second camera (not shown) or a capability to relocate camera 104 with respect to display 102. In an embodiment, system 200 may include a first eye contact correction module for a first relative position between camera 104 and display 102 and a second eye contact correction module for a second relative position between camera 104 and display 102. In an embodiment, system 200 may include multiple eye contact correction modules for multiple relative positions between camera 104 and display 102. For example, each eye contact correction module may have a different pretrained features reduction module 305 and/or random forest classifier 306. In other examples, a single eye contact correction module may implement (e.g., via loading from memory) different predetermined variables or data structures to provide multiple eye contact corrections each corresponding to different relative positions between camera 104 and display 102. For example, features reduction module 305 may implement different pretrained scaling and weighting factors responsive to or selectively based on camera 104 and display 102 having a particular relative position therebetween. In addition or in the alternative, random forest classifier 306 may apply different random forest models responsive to or selectively based on camera 104 and display 102 having a particular relative position therebetween.

For example, reducing the histogram of oriented gradient features and applying the pretrained classifier to feature set 312 to determine motion vector field 313 for eye region 311 of input image 212 as discussed above may be selectively provided based on camera 104 and display 102 having a first relative position therebetween (e.g., camera 104 being above display 102 to provide an offset 106). When camera 104 and display 102 have a second relative position therebetween (e.g., camera 104 below, left of, right of, further above, diagonal to display 102, or the like), the histogram of oriented gradient features may be reduced (e.g., by features reduction module 305 or another features reduction module) to a second feature set (not shown) based on different pretrained scaling and weighting factors, a second pretrained classifier may be applied (e.g., by random forest classifier 306 or another pretrained classifier such as another random forest classifier) to the second feature set to determine a second motion vector field (not shown). The second motion vector field may be used to warp the eye region of input image 212 and the warped eye region may be integrated into input image to generate eye contact corrected image 215. For example, such techniques may provide for the application of different pretrained models as an orientation or relative position between camera 104 and display 102 may change.

As discussed, various components or modules of system 200 may be pretrained in a training phase prior to deployment in an implementation phase.

Figure 8:
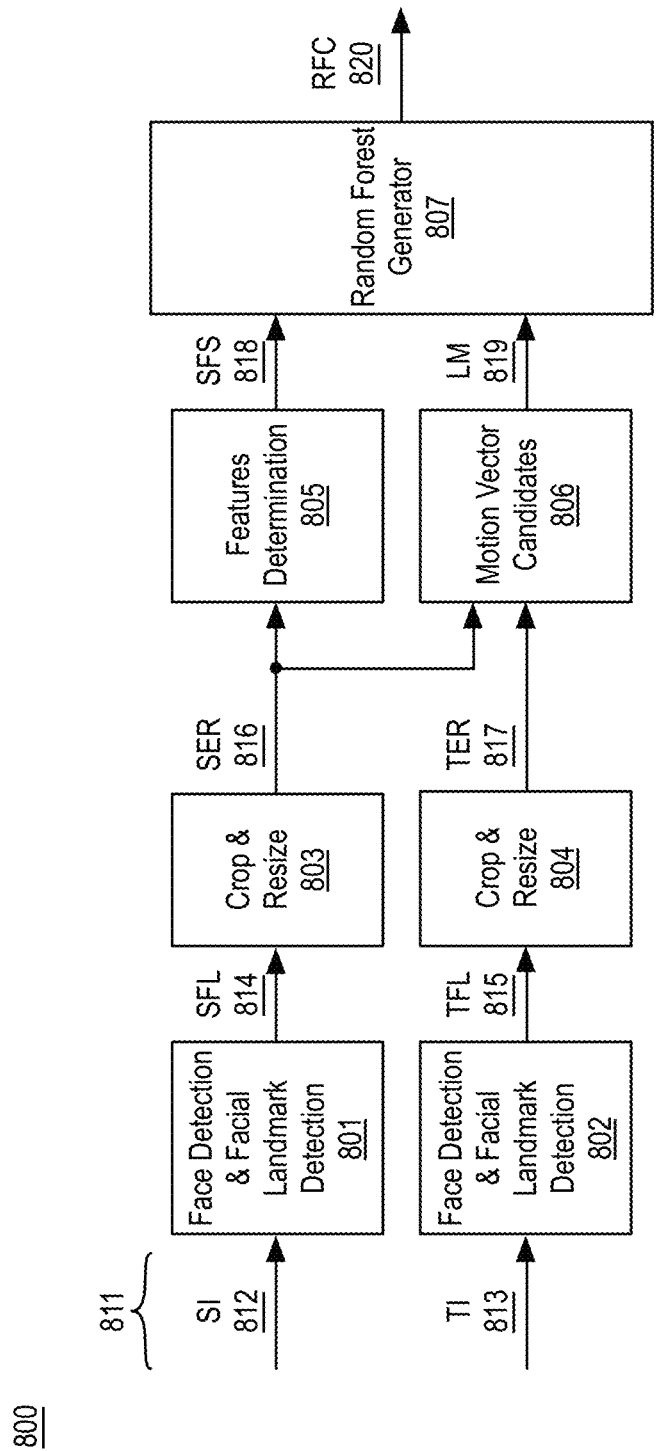
FIG. 8 illustrates an example system for pretraining an eye contact correction classifier.

FIG. 8 illustrates an example system 800 for pretraining an eye contact correction classifier, arranged in accordance with at least some implementations of the present disclosure. As shown in FIG. 8, system 800 may include a face detection and facial landmark detection module 801, a face detection and facial landmark detection module 802, a crop and resize module 803, a crop and resize module 804, a features determination module 805, a motion vector candidates module 806, and a random forest generator module 807. As shown, in some embodiments, face detection and facial landmark detection modules 801, 802 and crop and resize modules 803, 804 may be provided separately. In other examples, face detection and facial landmark detection modules 801, 802 and/or crop and resize modules 803, 804 may be provided together as a single face detection and facial landmark detection modules and/or a single crop and resize module. System 800 may be implemented via any suitable device such as device 101 and/or, for example, a personal computer, a laptop computer, a tablet, a phablet, a smart phone, a digital camera, a gaming console, a wearable device, a display device, an all-in-one device, a two-in-one device, or the like. Systems 800 and 200 may be provided separately or they may be provided together.

As shown, system 800 may receive training images 811 such that training images include pairs of source images 812 and target images 813. For example, each pair of training images 811 may include a source image and a corresponding target image such that the source and target images have a known gaze angle difference therebetween. System 800 may be used to generate a random forest classifier 820 for any number of sets of training images 811 having any suitable gaze angle difference therebetween.

Figure 9:
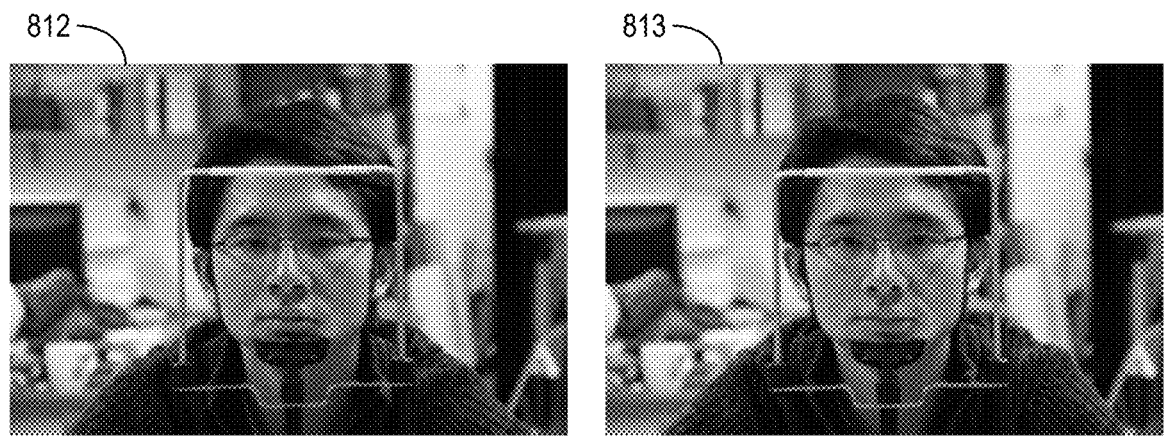
FIG. 9 illustrates an example source image and an example target image.

FIG. 9 illustrates an example source image 812 and an example target image 813, arranged in accordance with at least some implementations of the present disclosure. As shown in FIG. 9, source image 812 may include an image of a user looking in a downward direction with respect to a camera attaining source image 812 and target image 813 may include an image of the user looking at the camera. In the example of FIG. 9, source image 812 and target image 813 have approximately a 10° gaze angle difference (e.g., a 10° vertical gaze angle difference or offset).

Returning to FIG. 8, source images 812 and target images 813 may include any number of pairs of training images in analogy to those illustrated in FIG. 9. As shown, source images 812 may be received by face detection and facial landmark detection module 801, which may provide source facial landmarks (SFL) 814. Similarly, target images 813 may be received by face detection and facial landmark detection module 802, which may provide target facial landmarks (TFL) 815. Face detection and facial landmark detection modules 801, 802 may operate as discussed with respect to face detection and facial landmark detection module 301 (please refer to FIG. 3). Such discussion will not be repeated for the sake of brevity.

Figure 10:
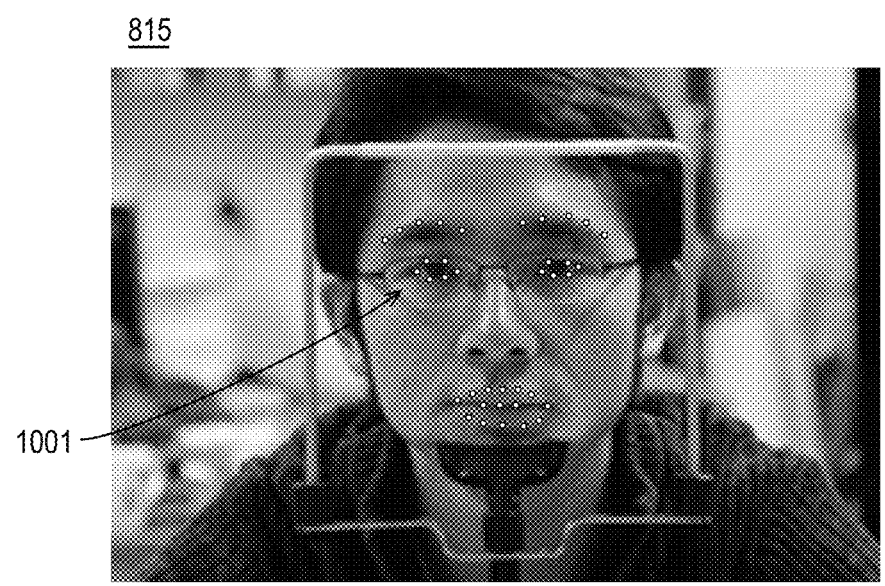
FIG. 10 illustrates example target facial landmarks.

FIG. 10 illustrates example target facial landmarks 815, arranged in accordance with at least some implementations of the present disclosure. As shown in FIG. 10, target facial landmarks 815 may include eye landmarks 1001. Eye landmarks 1000 may be generated using any suitable technique or techniques and may be characterized by a location within an image and/or descriptors corresponding to eye landmarks 1000 (e.g., a descriptor of eye, left eye, or the like). In the example of FIG. 10, target facial landmarks 815 corresponding to target image 813 are illustrated. As discussed, source facial landmarks 814 corresponding to source image 812 may also be determined.

Again returning to FIG. 8, source images 812 and source facial landmarks 814 may be received by crop and resize module 803, which may provide source eye regions (SER) 816. Similarly, target images 813 and target facial landmarks 815 may be received by crop and resize module 803, which may provide target eye regions (TER) 817. Crop and resize modules 803, 804 may operate as discussed with respect to crop and resize module 302 (please refer to FIG. 3). Such discussion will not be repeated for the sake of brevity.

Figure 11:
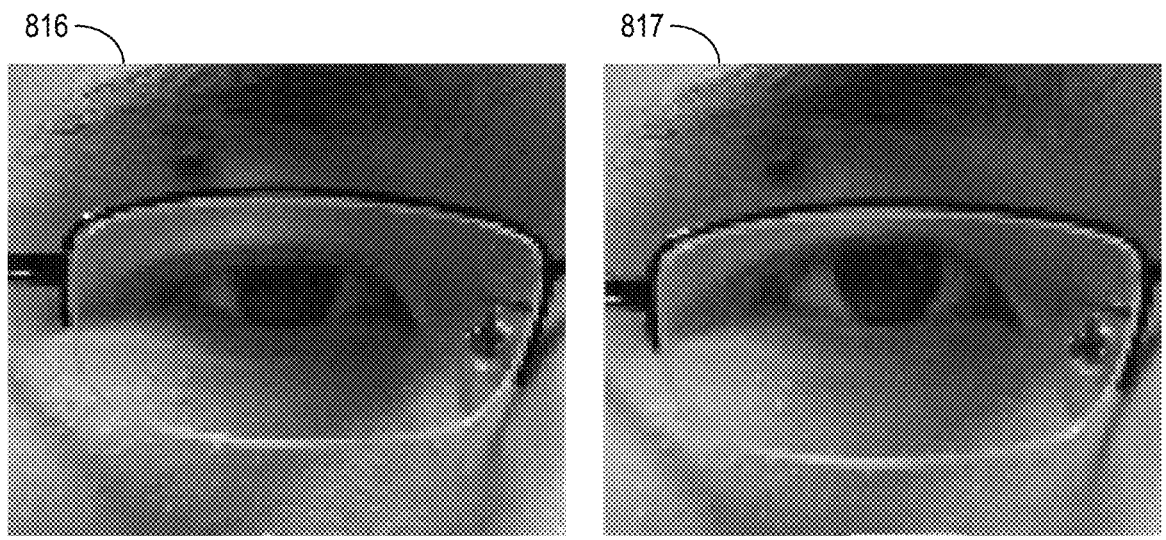
FIG. 11 illustrates an example source eye region and an example target eye region.

FIG. 11 illustrates an example source eye region 816 and an example target eye region 817, arranged in accordance with at least some implementations of the present disclosure. As shown in FIG. 11, eye regions 816, 817 may be cropped portions of source image 812 and target image 813, respectively. Furthermore, eye region 816 may include a user eye having a downward gaze and eye region 817 may include the user eye having a forward or straight ahead gaze.

Returning to FIG. 8, in addition to cropping and resizing, system 800 may align source eye regions 816 and target eye regions 817. For example, the alignment may include an affine transform to compensate for head movement between the corresponding source image 812 and target image 813.

As shown, source eye regions 816 and target eye regions 817 may be provided to motion vector candidates module 806. Motion vector candidates module 806 may determine likelihood maps (LM) 819 based on source eye regions 816 and target eye regions 817. For example, for each pixel location of source eye regions 816, multiple candidate motion vectors may be evaluated by determining a sum of absolute differences between a window around the pixel in source eye region 816 and a motion vector shifted window in target eye region 817. For example, the window or evaluation block may have a size of 6×6 pixels over a search range of 10×10 pixels at fixed intervals such as every pixel. Although discussed with respect to 6×6 pixel windows searched over a search range of 10×10 pixels at every pixel, any pixel window size, search range, and interval may be used.

For example, motion vector candidates module 806 may generate a very large data set of likelihood maps that provide candidate motion vectors or inverse probabilities. For example, lower sum of absolute differences may correlate to higher probability the optimal motion vector of the candidate motion vectors has been found. For example, the lower the sum of absolute differences at a specific shift (e.g., as provided by the corresponding motion vector), the closer or more likely the true best motion vector corresponds to that shift. The sum of absolute differences maps (e.g., likelihood maps 819) may be aggregated over all blocks in the aligned source eye regions 816 and target eye regions 817 pairs and all source images 812 and target images pairs 813 in training images 811

Figure 12:
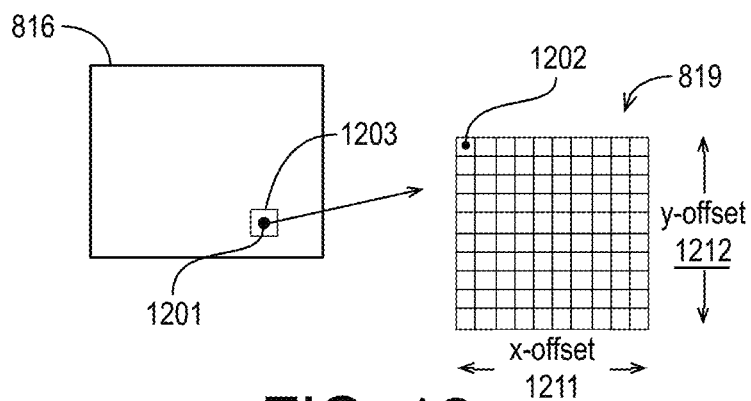
FIG. 12 illustrates an example likelihood map for an example source eye region.

FIG. 12 illustrates an example likelihood map 819 for an example source eye region 816, arranged in accordance with at least some implementations of the present disclosure. As shown in FIG. 12, for a pixel 1201 of source eye region 816, likelihood map 819 may be generated such that for an entry 1202 of likelihood map 819, a sum of absolute differences or similar measure of similarity may be determined between a window 1203 around pixel 1201 and multiple windows (not shown) in corresponding target eye region 817 (not shown). For example, entry 1202 may correspond to a comparison of window 1203 and a window in target eye region 817 at maximum negative x-offset 1211 and a maximum positive y-offset 1212 (e.g., corresponding to a motion vector with a maximum negative x-offset 1211 and a maximum positive y-offset 1212) with respect to pixel 1201. For each combination of x-offsets 1211 and y-offsets 1212, a corresponding entry in likelihood map 819 may be determined as a sum of absolute differences or similar measure of similarity. Furthermore, as discussed, a likelihood map may be generated for each pixel location of source eye region 816 and, further still, for each source eye region of source eye regions 816.

Returning to FIG. 8, features determination module 805 may receive source eye regions 816 and features determination module 805 may determine source feature sets (SFS) 818 based on source eye regions 816. For example, features determination module 805 may generate histogram of oriented gradient (HOG) features and apply principal component analysis to reduce the number of features. The histogram of oriented gradient features may be generated as discussed with respect to histogram of oriented gradient features module 304 (please refer to FIG. 3). The reduction of the histogram of oriented gradient features to source feature sets 818 may provide for a condensed feature set that may be used as a predictor by a pretrained classifier as discussed herein. Furthermore, the reduction of features may provide for reduced computational requirements during the implementation phase.

As discussed, in some examples, for source eye regions 816 of 50×60 pixels and 8 orientations, the full histogram of oriented gradient features size may be 50×60×8=24,000 features, which may be reduced by principal component analysis to about 100 features. For example, principal component analysis may provide dimensionality reduction to the histogram of oriented gradient features. Furthermore, the principal component analysis provided by features determination module 805 may provide pretrained scaling and weighting factors for implementation by features reduction module 305 during the implementation phase.

Figure 13:
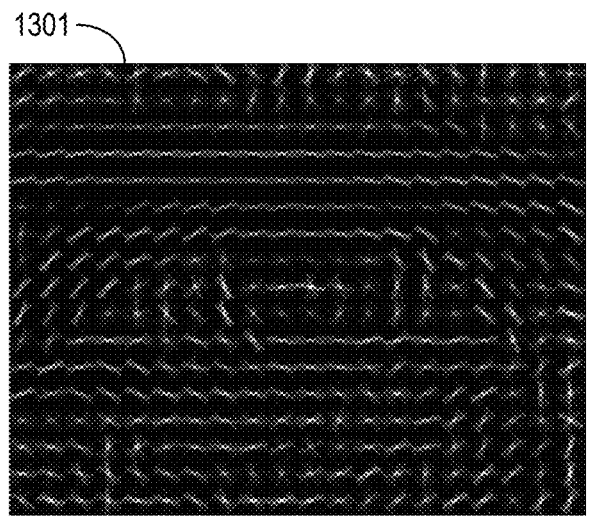
FIG. 13 illustrates an example histogram of oriented gradient features map.

FIG. 13 illustrates an example histogram of oriented gradient features map 1301, arranged in accordance with at least some implementations of the present disclosure. As shown in FIG. 13, histogram of oriented gradient features map 1301 may provide a robust appearance model for an eye region of an input image.

Returning to FIG. 8, source feature sets 818 may include a feature set for each source eye region of source eye regions 816 and likelihood maps 819 may include a likelihood map for each pixel (or block of pixels) of each source eye region of source eye regions 816. As shown, source feature sets 818 and likelihood maps 819 may be provided to random forest generator module 807, which may train and determine random forest classifier 820 based on source feature sets 818 and likelihood maps 819. For example, random forest classifier 820 may be trained to determine optimal motion vector fields from source feature sets 818 (e.g., compressed histogram of oriented gradient features). Training may be performed such that each leaf of a tree in random forest classifier 820 represents a likelihood map (e.g., a SAD map) for every pixel in a source eye region. At each branch of a tree, the training process may minimize the entropy between likelihood maps of the training observations that have arrived to that branch of the tree. Random forest classifier 820 may have any size and data structure as discussed herein such as about 4-8 trees having depths of about 6-7 levels. Furthermore, compression may be applied to generate random forest classifier 820. For example, a training stage pretrained classifier may be compressed by parameterized surface fitting or the like to generate random forest classifier 820.

Figure 14:
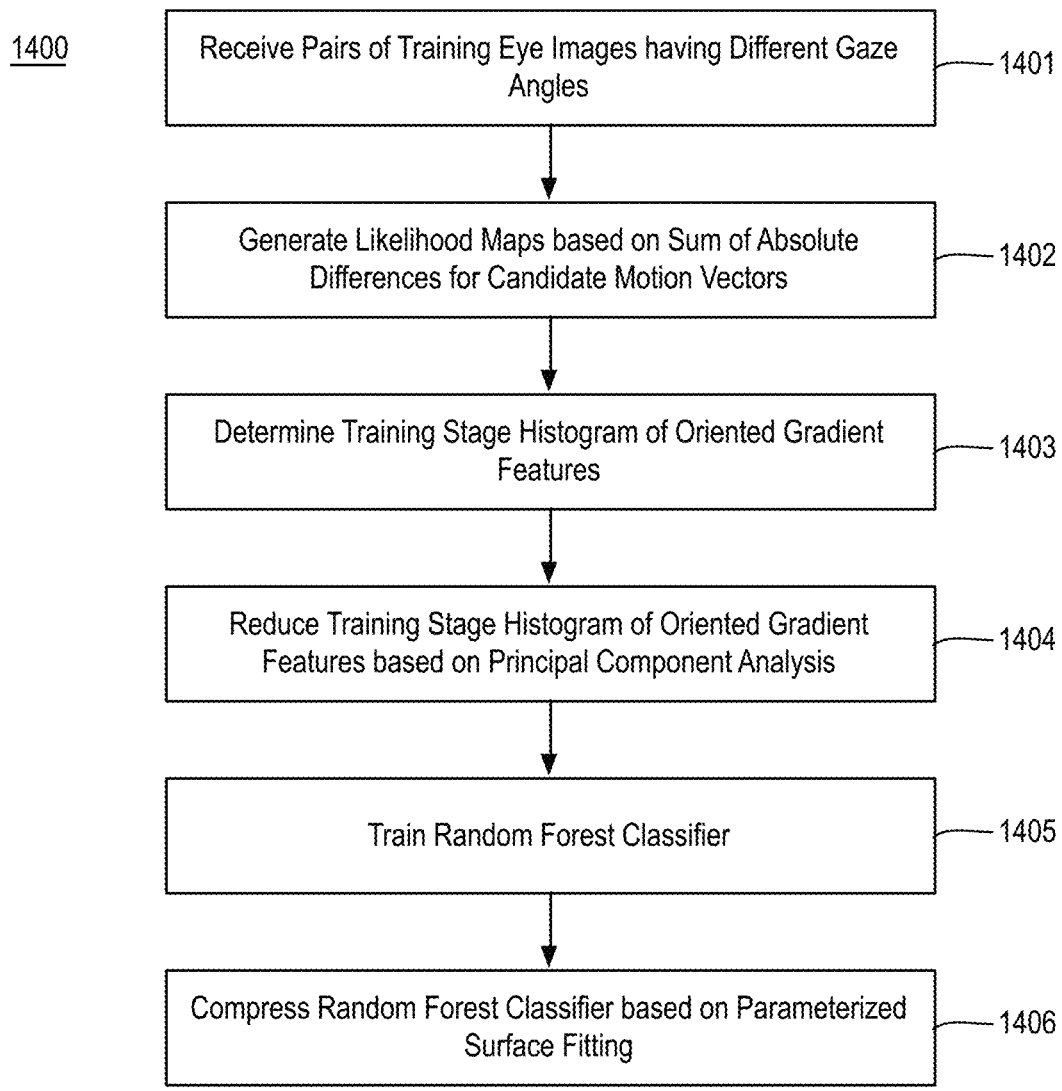
FIG. 14 is a flow diagram illustrating an example process for pretraining an eye contact correction classifier.

FIG. 14 is a flow diagram illustrating an example process 1400 for pretraining an eye contact correction classifier, arranged in accordance with at least some implementations of the present disclosure. Process 1400 may include one or more operations 1401-1406 as illustrated in FIG. 14. Process 1400 may form at least part of an eye contact correction classifier pretraining technique. By way of non-limiting example, process 1400 may form at least part of an eye contact correction classifier pretraining technique performed by system 800 as discussed herein. Furthermore, process 1400 may be performed by system 1600, which is described below.

Process 1400 may begin at operation 1401, where multiple of pairs of training eye region images may be received. For example, first images of the pairs of training eye region images may have a gaze angle difference with respect to second images of the pairs of training eye region images. In an embodiment, the multiple of pairs of training eye region images may be received by system 1600. For example, training images 811 or the like may be received.

Processing may continue at operation 1402, where a likelihood map may be generated for each pixel of each of the first images of the pairs of training eye region images. For example, each likelihood map may include a sum of absolute differences or other measure of similarity for each of multiple candidate motion vectors corresponding to each pixel. The likelihood maps be generated using any suitable technique or techniques. For example, likelihood maps may be generated by central processor 1601 of system 1600.

Processing may continue at operation 1403, where training stage histogram of oriented gradient features may be determined for the first images of the pairs of training eye region images. The histogram of oriented gradient features may be determined using any suitable technique or techniques. For example, determining the histogram of oriented gradient features may include determining counts of occurrences of gradient orientations in localized portions of each eye region (e.g., for localized portions corresponding to each pixel), the counts may be binned into histograms, and the histogram of oriented gradient features may be a concatenation of the histograms. In an embodiment, the training stage histogram of oriented gradient features may be determined by central processor 1601 of system 1600.

Processing may continue at operation 1404, where the training stage histogram of oriented gradient features may be reduced. The training stage histogram of oriented gradient features may be reduced using any suitable technique or techniques. In an embodiment, principal component analysis may be used to reduce the training stage histogram of oriented gradient features to multiple training stage feature sets corresponding to the first images of the pairs of training eye region images. In an embodiment, the principal component analysis may also determine pretrained scaling and weighting factors of the principal component analysis. Such pretrained scaling and weighting factors may be implemented in an implementation phase as discussed with respect to FIG. 15. In an embodiment, the training stage histogram of oriented gradient features may be reduced to generate training stage feature sets by central processor 1601 of system 1600.

Processing may continue at operation 1405, where a pretrained classifier may be trained based on the likelihood maps determined at operation 1402 and the training stage feature sets determined at operation 1404. The pretrained classifier may include any suitable pretrained classifier such as a random forest classifier and the pretrained classifier may be trained using any suitable technique or techniques. In an embodiment, the pretrained classifier may be trained by central processor 1601 of system 1600. In an embodiment, the pretrained classifier generated at operation 1405 may be characterized as a training stage pretrained classifier or the like.

Processing may continue at operation 1406, where the pretrained classifier generated at operation 1405 may be compressed. The pretrained classifier may be compressed using any suitable technique or techniques. In an embodiment, the pretrained classifier may be compressed based on parameterized surface fitting. In an embodiment, the pretrained classifier may be compressed by central processor 1601 of system 1600. In an embodiment, a training stage pretrained classifier determined at operation 1405 may be compressed by parameterized surface fitting at operation 1406 to generate a pretrained classifier such as a random forest classifier for implementation in an implementation phase to provide eye contact correction.

Figure 15:
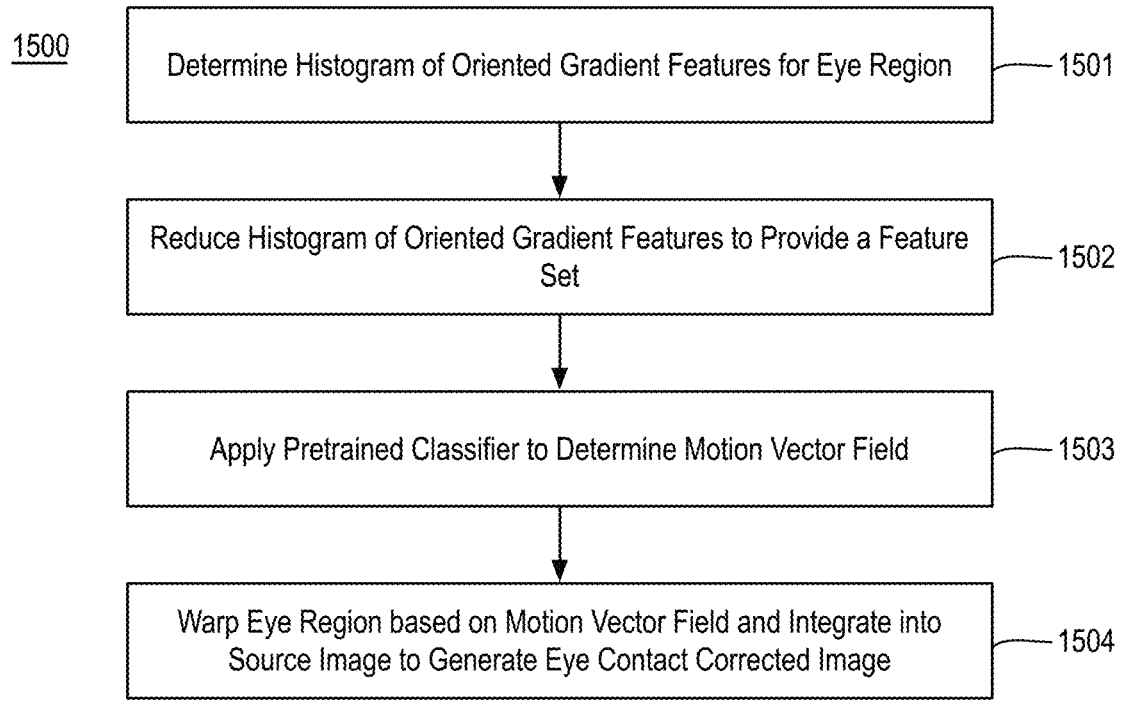
FIG. 15 is a flow diagram illustrating an example process for providing eye contact correction.

FIG. 15 is a flow diagram illustrating an example process 1500 for providing eye contact correction, arranged in accordance with at least some implementations of the present disclosure. Process 1500 may include one or more operations 1501-1504 as illustrated in FIG. 15. Process 1500 may form at least part of an eye contact correction technique. By way of non-limiting example, process 1500 may form at least part of an eye contact correction technique performed by system 200 as discussed herein. Furthermore, process 1500 will be described herein with reference to system 1600 of FIG. 16.

Figure 16:
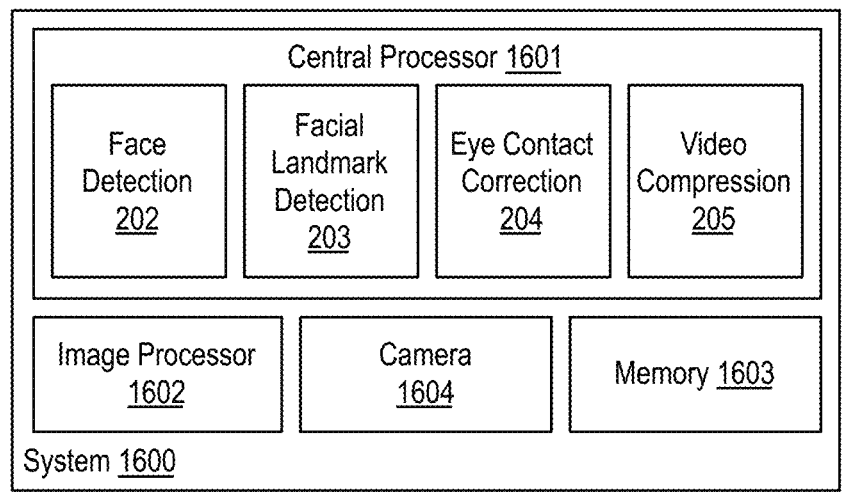
FIG. 16 is an illustrative diagram of an example system for providing eye contact correction.

FIG. 16 is an illustrative diagram of an example system 1600 for providing eye contact correction, arranged in accordance with at least some implementations of the present disclosure. As shown in FIG. 16, system 1600 may include a central processor 1601, an image processor 1602, a memory 1603, and a camera 1604. For example, camera 1604 and a display (not shown) may have an offset therebetween. Also as shown, central processor 1601 may include or implement face detection module 202, facial landmark detection module 203, eye contact correction module 204, and video compression module 205. Such components or modules may be implemented to perform operations as discussed herein. Memory 1603 may store images, image data, input images, image sensor data, face detection data, facial landmarks, eye contact correction images, compressed bitstreams, eye regions, feature sets, histogram of oriented gradient features, pretrained principal component analysis scaling and weighting factors, pretrained classifier models, or any other data discussed herein.

As shown, in some examples, face detection module 202, facial landmark detection module 203, eye contact correction module 204, and video compression module 205 may be implemented via central processor 1601. In other examples, one or more or portions of face detection module 202, facial landmark detection module 203, eye contact correction module 204, and video compression module 205 may be implemented via image processor 1602, a video processor, a graphics processor, or the like. In yet other examples, one or more or portions of face detection module 202, facial landmark detection module 203, eye contact correction module 204, and video compression module 205 may be implemented via an image or video processing pipeline or unit.

Image processor 1602 may include any number and type of graphics, image, or video processing units that may provide the operations as discussed herein. In some examples, image processor 1602 may be an image signal processor. Such operations may be implemented via software or hardware or a combination thereof. For example, image processor 1602 may include circuitry dedicated to manipulate frame data, image data, or video data obtained from memory 1603. Central processor 1601 may include any number and type of processing units or modules that may provide control and other high level functions for system 1600 and/or provide any operations as discussed herein. Memory 1603 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1603 may be implemented by cache memory.

In an embodiment, one or more or portions of face detection module 202, facial landmark detection module 203, eye contact correction module 204, and video compression module 205 may be implemented via an execution unit (EU) of image processor 1602. The EU may include, for example, programmable logic or circuitry such as a logic core or cores that may provide a wide array of programmable logic functions. In an embodiment, one or more or portions of face detection module 202, facial landmark detection module 203, eye contact correction module 204, and video compression module 205 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of face detection module 202, facial landmark detection module 203, eye contact correction module 204, and video compression module 205 may be implemented via an application specific integrated circuit (ASIC). The ASIC may include an integrated circuitry customized to perform the operations discussed herein. Camera 1604 may include any camera having any suitable number of lenses or the like for capturing images or video.

Returning to discussion of FIG. 15, process 1500 may begin at operation 1501, where histogram of oriented gradient features may be determined for an eye region of a source image. The histogram of oriented gradient features may be determined using any suitable technique or techniques. In an embodiment, histogram of oriented gradient features may be determined using any suitable technique or techniques. For example, determining the histogram of oriented gradient features may include determining counts of occurrences of gradient orientations in localized portions of the eye region (e.g., for localized portions corresponding to each pixel), the counts may be binned into histograms, and the histogram of oriented gradient features may be a concatenation of the histograms. In an embodiment, the histogram of oriented gradient features may be determined by central processor 1601 of system 1600.

Furthermore, in some embodiments, the eye region of the source image may be received. In other embodiments, the eye region may be generated from the source image. The eye region may be generated from the source image using any suitable technique or techniques. In an embodiment, the eye region may be generated from the source image by providing face detection and face landmark detection on the source image and cropping the source image based on the face detection and the face landmark detection to generate the eye region. In an embodiment, the eye region may be determined from the source image by central processor 1601 of system 1600.

Processing may continue at operation 1502, where the histogram of oriented gradient features may be reduced to provide a feature set corresponding to the eye region of the source image. The histogram of oriented gradient features may be reduced using any suitable technique or techniques. As discussed, reducing the histogram of oriented gradient features may be characterized as reducing the dimensionality of histogram of oriented gradient features, reducing the number of features from the histogram of oriented gradient features, or the like. In an embodiment, reducing the histogram of oriented gradient features to provide the feature set may include applying principal component analysis to the histogram of oriented gradient features. For example, the principal component analysis may include applying pretrained scaling and weighting factors. For example, the pretrained scaling and weighting factors of the principal component analysis may be provided at operation 1404 of process 1400. In an embodiment, the histogram of oriented gradient features may be reduced by central processor 1601 of system 1600.

Processing may continue at operation 1503, where a pretrained classifier may be applied to the feature set to determine a motion vector field for the eye region of the source image. The pretrained classifier may include any suitable pretrained classifier and the pretrained classifier may be applied using any suitable technique or techniques. In an embodiment, the pretrained classifier is a pretrained random forest classifier having a leaf corresponding to the motion vector field. In an embodiment, the pretrained classifier may be provided at operation 1406 of process 1400. In an embodiment, the pretrained classifier may be applied by central processor 1601 of system 1600.

Processing may continue at operation 1504, where the eye region of the source image may be warped based on the motion vector field and the warped eye region may be integrated into a remaining portion of the source image to generate an eye contact corrected image. For example, the remaining portion may be the portion of the source image other than the eye region being warped. The eye region may be warped and integrated into the remaining portion of the source image to generate the eye contact corrected image using any suitable technique or techniques. In an embodiment, the eye region may be warped and integrated into the remaining portion of the source image to generate the eye contact corrected image by central processor 1601 of system 1600. As discussed herein, the eye contact corrected image may provide an apparent gaze of the user toward a camera as opposed to toward a display (e.g., the eye contact corrected image may correct for an offset between a display and a camera) such that a remote user of the image has a more pleasing response and such that the user can look at the remote user on the local display. In an embodiment, the eye contact corrected image may be encoded and transmitted to a remote device for presentment to a user (e.g., a remote user of a remote device). For example, the eye contact corrected image may be an image (or frame) of a video sequence and the video sequence may be encoded and transmitted.

Process 1500 may be repeated for any number of eye regions of a source image, for any number of source images, or any number of video sequences of source images. Furthermore, as discussed, operations 1502 and/or 1503 may be responsive to or selectively provided based on a camera and a display having a first relative position therebetween. If the camera and display had a second relative position therebetween, operation 1502 and/or 1503 may be performed based on different pretrained factors (e.g., different pretrained scaling and weighting factors of principal component analysis and/or a different pretrained classifier). In an embodiment, when the camera and the display have a second relative position therebetween, process 1500 may further include reducing the histogram of oriented gradient features to provide a second feature set corresponding to the eye region of the source image, applying a second pretrained classifier to the second feature set to determine a second motion vector field for the eye region of the source image, and warping the eye region of the source image based on the second motion vector field and integrating the warped eye region into the remaining portion of the source image to generate the eye contact corrected image. For example, different pretrained models may be implemented responsive to the orientation or relative positions of a camera capturing the source image and a display at which the user is looking.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 17:
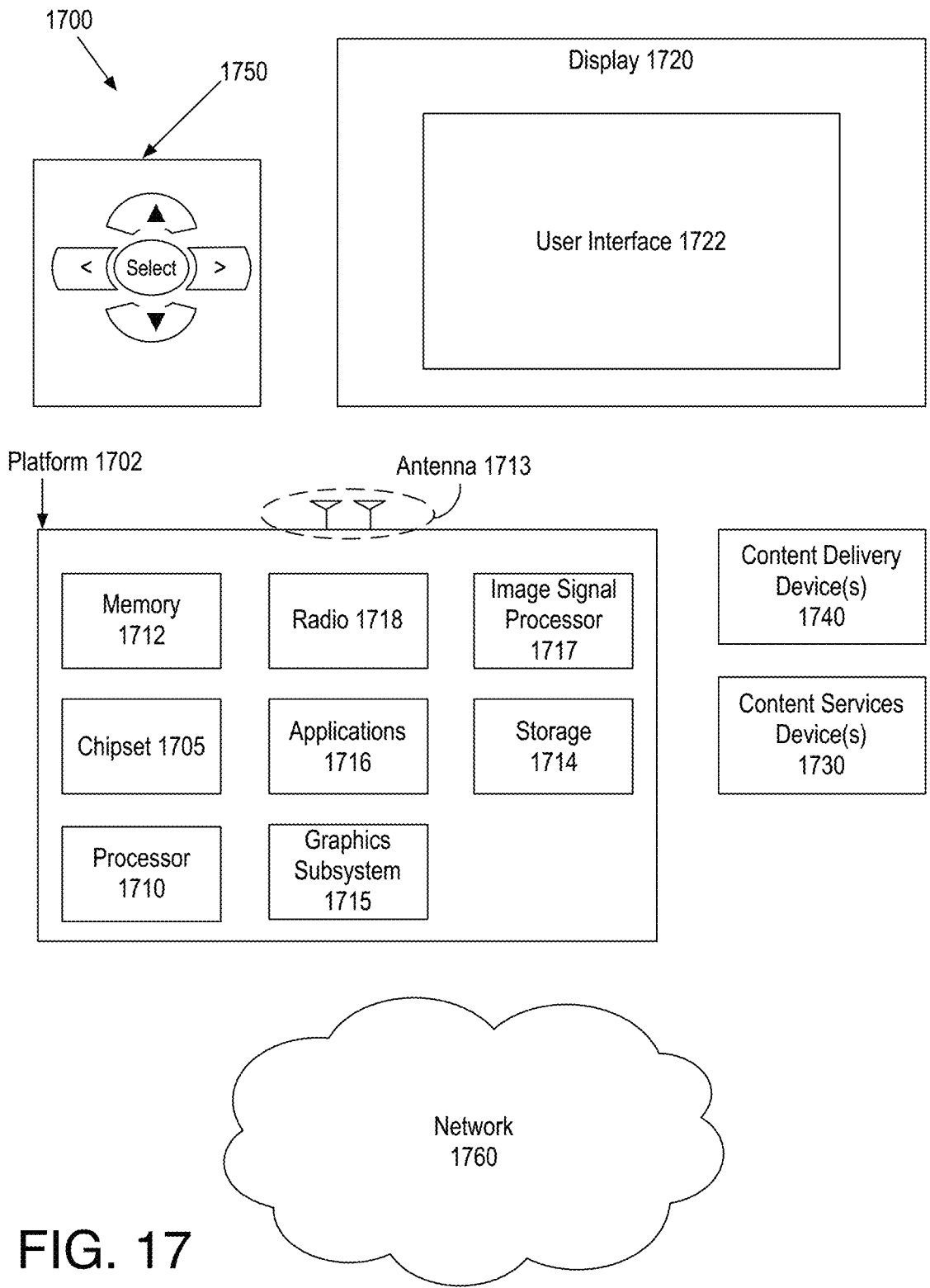
FIG. 17 is an illustrative diagram of an example system.

FIG. 17 is an illustrative diagram of an example system 1700, arranged in accordance with at least some implementations of the present disclosure. In various implementations, system 1700 may be a mobile system although system 1700 is not limited to this context. System 1700 may implement and/or perform any modules or techniques discussed herein. For example, system 1700 may be incorporated into a personal computer (PC), server, laptop computer, ultra-laptop computer, tablet, touch pad, portable computer, hand-held computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1700 may be implemented via a cloud computing environment.

In various implementations, system 1700 includes a platform 1702 coupled to a display 1720. Platform 1702 may receive content from a content device such as content services device(s) 1730 or content delivery device(s) 1740 or other similar content sources. A navigation controller 1750 including one or more navigation features may be used to interact with, for example, platform 1702 and/or display 1720. Each of these components is described in greater detail below.

In various implementations, platform 1702 may include any combination of a chipset 1705, processor 1710, memory 1712, antenna 1713, storage 1714, graphics subsystem 1715, applications 1716 and/or radio 1718. Chipset 1705 may provide intercommunication among processor 1710, memory 1712, storage 1714, graphics subsystem 1715, applications 1716 and/or radio 1718. For example, chipset 1705 may include a storage adapter (not depicted) capable of providing intercommunication with storage 1714.

Processor 1710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1710 may be dual-core processor(s), dual-core mobile processor(s), and so forth.

Memory 1712 may be implemented as a volatile memory device such as, but not limited to, a Random Access Memory (RAM), Dynamic Random Access Memory (DRAM), or Static RAM (SRAM).

Storage 1714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1714 may include technology to increase the storage performance enhanced protection for valuable digital media when multiple hard drives are included, for example.

Image signal processor 1717 may be implemented as a specialized digital signal processor or the like used for image or video frame processing. In some examples, image signal processor 1717 may be implemented based on a single instruction multiple data or multiple instruction multiple data architecture or the like. In some examples, image signal processor 1717 may be characterized as a media processor. As discussed herein, image signal processor 1717 may be implemented based on a system on a chip architecture and/or based on a multi-core architecture.

Graphics subsystem 1715 may perform processing of images such as still or video for display. Graphics subsystem 1715 may be a graphics processing unit (GPU) or a visual processing unit (VPU), for example. An analog or digital interface may be used to communicatively couple graphics subsystem 1715 and display 1720. For example, the interface may be any of a High-Definition Multimedia Interface, DisplayPort, wireless HDMI, and/or wireless HD compliant techniques. Graphics subsystem 1715 may be integrated into processor 1710 or chipset 1705. In some implementations, graphics subsystem 1715 may be a stand-alone device communicatively coupled to chipset 1705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1718 may operate in accordance with one or more applicable standards in any version.

In various implementations, display 1720 may include any television type monitor or display. Display 1720 may include, for example, a computer display screen, touch screen display, video monitor, television-like device, and/or a television. Display 1720 may be digital and/or analog. In various implementations, display 1720 may be a holographic display. Also, display 1720 may be a transparent surface that may receive a visual projection. Such projections may convey various forms of information, images, and/or objects. For example, such projections may be a visual overlay for a mobile augmented reality (MAR) application. Under the control of one or more software applications 1716, platform 1702 may display user interface 1722 on display 1720.

In various implementations, content services device(s) 1730 may be hosted by any national, international and/or independent service and thus accessible to platform 1702 via the Internet, for example. Content services device(s) 1730 may be coupled to platform 1702 and/or to display 1720. Platform 1702 and/or content services device(s) 1730 may be coupled to a network 1760 to communicate (e.g., send and/or receive) media information to and from network 1760. Content delivery device(s) 1740 also may be coupled to platform 1702 and/or to display 1720.

In various implementations, content services device(s) 1730 may include a cable television box, personal computer, network, telephone, Internet enabled devices or appliance capable of delivering digital information and/or content, and any other similar device capable of uni-directionally or bi-directionally communicating content between content providers and platform 1702 and/display 1720, via network 1760 or directly. It will be appreciated that the content may be communicated uni-directionally and/or bi-directionally to and from any one of the components in system 1700 and a content provider via network 1760. Examples of content may include any media information including, for example, video, music, medical and gaming information, and so forth.

Content services device(s) 1730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1702 may receive control signals from navigation controller 1750 having one or more navigation features. The navigation features of navigation controller 1750 may be used to interact with user interface 1722, for example. In various embodiments, navigation controller 1750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1750 may be replicated on a display (e.g., display 1720) by movements of a pointer, cursor, focus ring, or other visual indicators displayed on the display. For example, under the control of software applications 1716, the navigation features located on navigation controller 1750 may be mapped to virtual navigation features displayed on user interface 1722, for example. In various embodiments, navigation controller 1750 may not be a separate component but may be integrated into platform 1702 and/or display 1720. The present disclosure, however, is not limited to the elements or in the context shown or described herein.

In various implementations, drivers (not shown) may include technology to enable users to instantly turn on and off platform 1702 like a television with the touch of a button after initial boot-up, when enabled, for example. Program logic may allow platform 1702 to stream content to media adaptors or other content services device(s) 1730 or content delivery device(s) 1740 even when the platform is turned "off." In addition, chipset 1705 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1700 may be integrated. For example, platform 1702 and content services device(s) 1730 may be integrated, or platform 1702 and content delivery device(s) 1740 may be integrated, or platform 1702, content services device(s) 1730, and content delivery device(s) 1740 may be integrated, for example. In various embodiments, platform 1702 and display 1720 may be an integrated unit. Display 1720 and content service device(s) 1730 may be integrated, or display 1720 and content delivery device(s) 1740 may be integrated, for example. These examples are not meant to limit the present disclosure.

In various embodiments, system 1700 may be implemented as a wireless system, a wired system, or a combination of both. When implemented as a wireless system, system 1700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 17.

Figure 18:
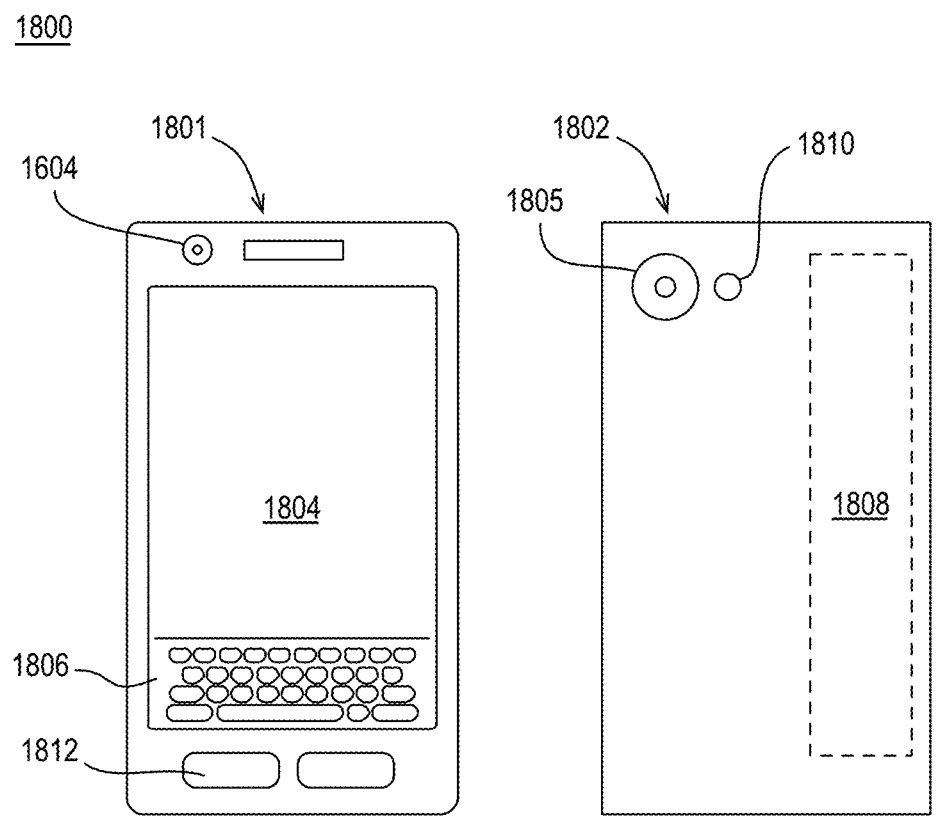
FIG. 18 illustrates an example small form factor device, all arranged in accordance with at least some implementations of the present disclosure.

As described above, system 1700 may be embodied in varying physical styles or form factors. FIG. 18 illustrates an example small form factor device 1800, arranged in accordance with at least some implementations of the present disclosure. In some examples, system 1700 may be implemented via device 1800. In other examples, other systems discussed herein or portions thereof may be implemented via device 1800. In various embodiments, for example, device 1800 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 18, device 1800 may include a housing with a front 1801 and a back 1802. Device 1800 includes a display 1804, an input/output (I/O) device 1806, camera 1604, a camera 1805, and an integrated antenna 1808. Device 1800 also may include navigation features 1812. I/O device 1806 may include any suitable I/O device for entering information into a mobile computing device. Examples for I/O device 1806 may include an alphanumeric keyboard, a numeric keypad, a touch pad, input keys, buttons, switches, microphones, speakers, voice recognition device and software, and so forth. Information also may be entered into device 1800 by way of microphone (not shown), or may be digitized by a voice recognition device. As shown, device 1800 may include camera 1805 and a flash 1810 integrated into back 1802 (or elsewhere) of device 1800 and camera 1604 integrated into front 1801 of device 1800. In some embodiments, either or both of cameras 1604, 1805 may be moveable with respect to display 1804. Camera 1604 and/or camera 1805 may be components of an imaging module or pipeline to originate color image data processed into streaming video that is output to display 1804 and/or communicated remotely from device 1800 via antenna 1808 for example. For example, camera 1604 may capture input images and eye contact corrected images may be provided to display 1804 and/or communicated remotely from device 1800 via antenna 1808.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a machine implemented method for providing eye contact correction comprises determining histogram of oriented gradient features for an eye region of a source image, reducing the histogram of oriented gradient features to provide a feature set corresponding to the eye region of the source image, applying a pretrained classifier to the feature set to determine a motion vector field for the eye region of the source image, and warping the eye region of the source image based on the motion vector field and integrating the warped eye region into a remaining portion of the source image to generate an eye contact corrected image.

Further to the first embodiments, reducing the histogram of oriented gradient features to provide the feature set comprises applying principal component analysis to the histogram of oriented gradient features, wherein the principal component analysis comprises pretrained scaling and weighting factors.

Further to the first embodiments, the pretrained classifier comprises a pretrained random forest classifier having a leaf corresponding to the motion vector field.

Further to the first embodiments, the method further comprises providing face detection and face landmark detection on the source image and cropping the source image based on the face detection and the face landmark detection to generate the eye region.

Further to the first embodiments, the method further comprises encoding and transmitting the eye contact corrected image to a remote device for presentment to a user.

Further to the first embodiments, the method further comprises providing face detection and face landmark detection on the source image and cropping the source image based on the face detection and the face landmark detection to generate the eye region and/or encoding and transmitting the eye contact corrected image to a remote device for presentment to a user.

Further to the first embodiments, said reducing the histogram of oriented gradient features and said applying the pretrained classifier to the feature set to determine the motion vector field for the eye region of the source image are selectively provided based on a camera and a display having a first relative position therebetween, the method further comprising, when the camera and the display have a second relative position therebetween reducing the histogram of oriented gradient features to provide a second feature set corresponding to the eye region of the source image, applying a second pretrained classifier to the second feature set to determine a second motion vector field for the eye region of the source image, and warping the eye region of the source image based on the second motion vector field and integrating the warped eye region into the remaining portion of the source image to generate the eye contact corrected image.

Further to the first embodiments, the method further comprises receiving a plurality of pairs of training eye region images, wherein first images of the pairs of training eye region images have a gaze angle difference with respect to second images of the pairs of training eye region images, generating a likelihood map for each pixel of each of the first images of the pairs of training eye region images, wherein each likelihood map comprises a sum of absolute differences for each of a plurality of candidate motion vectors corresponding to each pixel, determining training stage histogram of oriented gradient features for the first images of the pairs of training eye region images, and applying principal component analysis to reduce the training stage histogram of oriented gradient features to a plurality of training stage feature sets corresponding to the first images of the pairs of training eye region images and to determine pretrained scaling and weighting factors of the principal component analysis.

Further to the first embodiments, the method further comprises receiving a plurality of pairs of training eye region images, wherein first images of the pairs of training eye region images have a gaze angle difference with respect to second images of the pairs of training eye region images, generating a likelihood map for each pixel of each of the first images of the pairs of training eye region images, wherein each likelihood map comprises a sum of absolute differences for each of a plurality of candidate motion vectors corresponding to each pixel, determining training stage histogram of oriented gradient features for the first images of the pairs of training eye region images, applying principal component analysis to reduce the training stage histogram of oriented gradient features to a plurality of training stage feature sets corresponding to the first images of the pairs of training eye region images and to determine pretrained scaling and weighting factors of the principal component analysis, and training a training stage pretrained classifier based on the likelihood maps and the training stage feature sets.

Further to the first embodiments, the method further comprises receiving a plurality of pairs of training eye region images, wherein first images of the pairs of training eye region images have a gaze angle difference with respect to second images of the pairs of training eye region images, generating a likelihood map for each pixel of each of the first images of the pairs of training eye region images, wherein each likelihood map comprises a sum of absolute differences for each of a plurality of candidate motion vectors corresponding to each pixel, determining training stage histogram of oriented gradient features for the first images of the pairs of training eye region images, applying principal component analysis to reduce the training stage histogram of oriented gradient features to a plurality of training stage feature sets corresponding to the first images of the pairs of training eye region images and to determine pretrained scaling and weighting factors of the principal component analysis, training a training stage pretrained classifier based on the likelihood maps and the training stage feature sets, and compressing the training stage pretrained classifier by parameterized surface fitting to generate the pretrained classifier.

In one or more second embodiments, a system for providing eye contact correction comprises a memory configured to store a source image and a processor coupled to the memory, the processor to determine histogram of oriented gradient features for an eye region of a source image, to reduce the histogram of oriented gradient features to provide a feature set corresponding to the eye region of the source image, to apply a pretrained classifier to the feature set to determine a motion vector field for the eye region of the source image, and to warp the eye region of the source image based on the motion vector field and integrate the warped eye region into a remaining portion of the source image to generate an eye contact corrected image.

Further to the second embodiments, to reduce the histogram of oriented gradient features to provide the feature set comprises the processor to apply principal component analysis to the histogram of oriented gradient features, wherein the principal component analysis comprises pretrained scaling and weighting factors.

Further to the second embodiments, the pretrained classifier comprises a pretrained random forest classifier having a leaf corresponding to the motion vector field.

Further to the second embodiments, the processor is further to provide face detection and face landmark detection on the source image and crop the source image based on the face detection and the face landmark detection to generate the eye region.

Further to the second embodiments, the processor is further to encode and transmit the eye contact corrected image to a remote device for presentment to a user.

Further to the second embodiments, to reduce the histogram of oriented gradient features and to apply the pretrained classifier to the feature set to determine the motion vector field for the eye region of the source image are selectively provided based on a camera and a display having a first relative position therebetween, the processor further, when the camera and the display have a second relative position therebetween, to reduce the histogram of oriented gradient features to provide a second feature set corresponding to the eye region of the source image, to apply a second pretrained classifier to the second feature set to determine a second motion vector field for the eye region of the source image, and to warp the eye region of the source image based on the second motion vector field and integrate the warped eye region into the remaining portion of the source image to generate the eye contact corrected image.

Further to the second embodiments, the processor is further to receive a plurality of pairs of training eye region images, wherein first images of the pairs of training eye region images have a gaze angle difference with respect to second images of the pairs of training eye region images, to generate a likelihood map for each pixel of each of the first images of the pairs of training eye region images, wherein each likelihood map comprises a sum of absolute differences for each of a plurality of candidate motion vectors corresponding to each pixel, to determine training stage histogram of oriented gradient features for the first images of the pairs of training eye region images, and to apply principal component analysis to reduce the training stage histogram of oriented gradient features to a plurality of training stage feature sets corresponding to the first images of the pairs of training eye region images and to determine pretrained scaling and weighting factors of the principal component analysis.

Further to the second embodiments, the processor is further to receive a plurality of pairs of training eye region images, wherein first images of the pairs of training eye region images have a gaze angle difference with respect to second images of the pairs of training eye region images, to generate a likelihood map for each pixel of each of the first images of the pairs of training eye region images, wherein each likelihood map comprises a sum of absolute differences for each of a plurality of candidate motion vectors corresponding to each pixel, to determine training stage histogram of oriented gradient features for the first images of the pairs of training eye region images, to apply principal component analysis to reduce the training stage histogram of oriented gradient features to a plurality of training stage feature sets corresponding to the first images of the pairs of training eye region images and to determine pretrained scaling and weighting factors of the principal component analysis, and to train a training stage pretrained classifier based on the likelihood maps and the training stage feature sets.

Further to the second embodiments, the processor is further to receive a plurality of pairs of training eye region images, wherein first images of the pairs of training eye region images have a gaze angle difference with respect to second images of the pairs of training eye region images, to generate a likelihood map for each pixel of each of the first images of the pairs of training eye region images, wherein each likelihood map comprises a sum of absolute differences for each of a plurality of candidate motion vectors corresponding to each pixel, to determine training stage histogram of oriented gradient features for the first images of the pairs of training eye region images, to apply principal component analysis to reduce the training stage histogram of oriented gradient features to a plurality of training stage feature sets corresponding to the first images of the pairs of training eye region images and to determine pretrained scaling and weighting factors of the principal component analysis, to train a training stage pretrained classifier based on the likelihood maps and the training stage feature sets, and to compress the training stage pretrained classifier by parameterized surface fitting to generate the pretrained classifier.

In one or more third embodiments, a system comprises means for determining histogram of oriented gradient features for an eye region of a source image, means for reducing the histogram of oriented gradient features to provide a feature set corresponding to the eye region of the source image, means for applying a pretrained classifier to the feature set to determine a motion vector field for the eye region of the source image, and means for warping the eye region of the source image based on the motion vector field and integrating the warped eye region into a remaining portion of the source image to generate an eye contact corrected image.

Further to the third embodiments, the means for reducing the histogram of oriented gradient features to provide the feature set comprise means for applying principal component analysis to the histogram of oriented gradient features, wherein the principal component analysis comprises pretrained scaling and weighting factors.

Further to the third embodiments, the pretrained classifier comprises a pretrained random forest classifier having a leaf corresponding to the motion vector field.

Further to the third embodiments, the means for reducing the histogram of oriented gradient features and the means for applying the pretrained classifier to the feature set to determine the motion vector field for the eye region of the source image are implemented responsive to a camera and a display having a first relative position therebetween, the system further comprising, when the camera and the display have a second relative position therebetween, means for reducing the histogram of oriented gradient features to provide a second feature set corresponding to the eye region of the source image, means for applying a second pretrained classifier to the second feature set to determine a second motion vector field for the eye region of the source image, and means for warping the eye region of the source image based on the second motion vector field and integrating the warped eye region into the remaining portion of the source image to generate the eye contact corrected image.

Further to the third embodiments, the system further comprises means for receiving a plurality of pairs of training eye region images, wherein first images of the pairs of training eye region images have a gaze angle difference with respect to second images of the pairs of training eye region images, means for generating a likelihood map for each pixel of each of the first images of the pairs of training eye region images, wherein each likelihood map comprises a sum of absolute differences for each of a plurality of candidate motion vectors corresponding to each pixel, means for determining training stage histogram of oriented gradient features for the first images of the pairs of training eye region images, and means for applying principal component analysis to reduce the training stage histogram of oriented gradient features to a plurality of training stage feature sets corresponding to the first images of the pairs of training eye region images and to determine pretrained scaling and weighting factors of the principal component analysis.

Further to the third embodiments, the system further comprises means for receiving a plurality of pairs of training eye region images, wherein first images of the pairs of training eye region images have a gaze angle difference with respect to second images of the pairs of training eye region images, means for generating a likelihood map for each pixel of each of the first images of the pairs of training eye region images, wherein each likelihood map comprises a sum of absolute differences for each of a plurality of candidate motion vectors corresponding to each pixel, means for determining training stage histogram of oriented gradient features for the first images of the pairs of training eye region images, means for applying principal component analysis to reduce the training stage histogram of oriented gradient features to a plurality of training stage feature sets corresponding to the first images of the pairs of training eye region images and to determine pretrained scaling and weighting factors of the principal component analysis, means for training a training stage pretrained classifier based on the likelihood maps and the training stage feature sets, and means for compressing the training stage pretrained classifier by parameterized surface fitting to generate the pretrained classifier.

In one or more fourth embodiments, at least one machine readable medium comprises a plurality of instructions that, in response to being executed on a device, cause the device to provide eye contact correction by determining histogram of oriented gradient features for an eye region of a source image, reducing the histogram of oriented gradient features to provide a feature set corresponding to the eye region of the source image, applying a pretrained classifier to the feature set to determine a motion vector field for the eye region of the source image, and warping the eye region of the source image based on the motion vector field and integrating the warped eye region into a remaining portion of the source image to generate an eye contact corrected image.

Further to the fourth embodiments, reducing the histogram of oriented gradient features to provide the feature set comprises applying principal component analysis to the histogram of oriented gradient features, wherein the principal component analysis comprises pretrained scaling and weighting factors.

Further to the fourth embodiments, the pretrained classifier comprises a pretrained random forest classifier having a leaf corresponding to the motion vector field.

Further to the fourth embodiments, said reducing the histogram of oriented gradient features and said applying the pretrained classifier to the feature set to determine the motion vector field for the eye region of the source image are selectively provided based on a camera and a display having a first relative position therebetween, the machine readable medium further comprising a plurality of instructions that, in response to being executed on the device, cause the device to, when the camera and the display have a second relative position therebetween, provide eye contact correction by, reducing the histogram of oriented gradient features to provide a second feature set corresponding to the eye region of the source image, applying a second pretrained classifier to the second feature set to determine a second motion vector field for the eye region of the source image, and warping the eye region of the source image based on the second motion vector field and integrating the warped eye region into the remaining portion of the source image to generate the eye contact corrected image.

Further to the fourth embodiments, the machine readable medium further comprises a plurality of instructions that, in response to being executed on the device, cause the device to provide eye contact correction by receiving a plurality of pairs of training eye region images, wherein first images of the pairs of training eye region images have a gaze angle difference with respect to second images of the pairs of training eye region images, generating a likelihood map for each pixel of each of the first images of the pairs of training eye region images, wherein each likelihood map comprises a sum of absolute differences for each of a plurality of candidate motion vectors corresponding to each pixel, determining training stage histogram of oriented gradient features for the first images of the pairs of training eye region images, and applying principal component analysis to reduce the training stage histogram of oriented gradient features to a plurality of training stage feature sets corresponding to the first images of the pairs of training eye region images and to determine pretrained scaling and weighting factors of the principal component analysis.

Further to the fourth embodiments, the machine readable medium further comprises a plurality of instructions that, in response to being executed on the device, cause the device to provide eye contact correction by receiving a plurality of pairs of training eye region images, wherein first images of the pairs of training eye region images have a gaze angle difference with respect to second images of the pairs of training eye region images, generating a likelihood map for each pixel of each of the first images of the pairs of training eye region images, wherein each likelihood map comprises a sum of absolute differences for each of a plurality of candidate motion vectors corresponding to each pixel, determining training stage histogram of oriented gradient features for the first images of the pairs of training eye region images, applying principal component analysis to reduce the training stage histogram of oriented gradient features to a plurality of training stage feature sets corresponding to the first images of the pairs of training eye region images and to determine pretrained scaling and weighting factors of the principal component analysis, training a training stage pretrained classifier based on the likelihood maps and the training stage feature sets, and compressing the training stage pretrained classifier by parameterized surface fitting to generate the pretrained classifier.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A machine implemented method for providing eye contact correction comprising:
    determining histogram of oriented gradient features for an eye region of a source image;
    reducing the histogram of oriented gradient features to provide a feature set corresponding to the eye region of the source image by applying principal component analysis to the histogram of oriented gradient features using pretrained scaling and weighting factors trained based on a plurality of pairs of training eye region images comprising first images having a gaze angle difference with respect to second images of the pairs of training eye region images, generation of a likelihood map for each pixel of each of the first images of the pairs of training eye region images, wherein each likelihood map comprises a sum of absolute differences for each of a plurality of candidate motion vectors corresponding to each pixel, determination of training stage histogram of oriented gradient features for the first images of the pairs of training eye region images, and application of principal component analysis to reduce the training stage histogram of oriented gradient features to a plurality of training stage feature sets corresponding to the first images of the pairs of training eye region images and to determine the pretrained scaling and weighting factors of the principal component analysis;
    applying a pretrained random forest classifier to the entire feature set to determine a leaf of the pretrained random forest classifier that correlates the feature set to a motion vector field for the eye region of the source image; and
    warping the eye region of the source image based on the motion vector field and integrating the warped eye region into a remaining portion of the source image to generate an eye contact corrected image.

2. The method of claim 1, further comprising:
    providing face detection and face landmark detection on the source image; and
    cropping the source image based on the face detection and the face landmark detection to generate the eye region.

3. The method of claim 1, further comprising:
    encoding and transmitting the eye contact corrected image to a remote device for presentment to a user.

4. The method of claim 1, wherein said reducing the histogram of oriented gradient features and said applying the pretrained random forest classifier to the feature set to determine the leaf of the pretrained random forest classifier that correlates the feature set to the motion vector field for the eye region of the source image are selectively provided based on a camera and a display having a first relative position therebetween, the method further comprising, when the camera and the display have a second relative position therebetween:

reducing the histogram of oriented gradient features to provide a second feature set corresponding to the eye region of the source image;

applying a second pretrained classifier to the second feature set to determine a second motion vector field for the eye region of the source image; and warping the eye region of the source image based on the second motion vector field and integrating the warped eye region into the remaining portion of the source image to generate the eye contact corrected image.

5. The method of claim 1, wherein the pretrained random forest classifier is generated based on a training stage pretrained classifier trained based on the likelihood maps and the training stage feature sets.

6. The method of claim 5, wherein the pretrained random forest classifier is further generated based on compression of the training stage pretrained classifier by parameterized surface fitting to generate the pretrained random forest classifier.

7. A system for providing eye contact correction comprising:

a memory configured to store a source image; and a processor coupled to the memory, the processor to:

determine histogram of oriented gradient features for an eye region of a source image;

reduce the histogram of oriented gradient features to provide a feature set corresponding to the eye region of the source image by the processor to apply principal component analysis to the histogram of oriented gradient features using pretrained scaling and weighting factors trained based on a plurality of pairs of training eye region images comprising first images of the pairs having a gaze angle difference with respect to second images of the pairs of training eye region images, generation of a likelihood map for each pixel of each of the first images of the pairs of training eye region images, wherein each likelihood map comprises a sum of absolute differences for each of a plurality of candidate motion vectors corresponding to each pixel, determination of training stage histogram of oriented gradient features for the first images of the pairs of training eye region images, and application of principal component analysis to reduce the training stage histogram of oriented gradient features to a plurality of training stage feature sets corresponding to the first images of the pairs of training eye region images and to determine the pretrained scaling and weighting factors of the principal component analysis;

apply a pretrained random forest classifier to the entire feature set to determine a leaf of the pretrained random forest classifier that correlates the feature set to a motion vector field for the eye region of the source image; and warp the eye region of the source image based on the motion vector field and integrate the warped eye region into a remaining portion of the source image to generate an eye contact corrected image.

8. The system of claim 7, wherein to reduce the histogram of oriented gradient features and to apply the pretrained random forest classifier to the feature set to determine the leaf of the pretrained random forest classifier that correlates the feature set to the motion vector field for the eye region of the source image are selectively provided based on a camera and a display having a first relative position therebetween, the processor further, when the camera and the display have a second relative position therebetween, to reduce the histogram of oriented gradient features to provide a second feature set corresponding to the eye region of the source image, to apply a second pretrained classifier to the second feature set to determine a second motion vector field for the eye region of the source image, and to warp the eye region of the source image based on the second motion vector field and integrate the warped eye region into the remaining portion of the source image to generate the eye contact corrected image.

9. The system of claim 7, wherein the pretrained random forest classifier is generated based on a training stage pretrained classifier trained based on the likelihood maps and the training stage feature sets, and compression of the training stage pretrained classifier by parameterized surface fitting to generate the pretrained classifier.

10. At least one non-transitory machine readable medium comprising a plurality of instructions that, in response to being executed on a device, cause the device to provide eye contact correction by:

determining histogram of oriented gradient features for an eye region of a source image;

reducing the histogram of oriented gradient features to provide a feature set corresponding to the eye region of the source image by applying principal component analysis to the histogram of oriented gradient features using pretrained scaling and weighting factors trained based on a plurality of pairs of training eye region images comprising first images having a gaze angle difference with respect to second images of the pairs of training eye region images, generation of a likelihood map for each pixel of each of the first images of the pairs of training eye region images, wherein each likelihood map comprises a sum of absolute differences for each of a plurality of candidate motion vectors corresponding to each pixel, determination of training stage histogram of oriented gradient features for the first images of the pairs of training eye region images, and application of principal component analysis to reduce the training stage histogram of oriented gradient features to a plurality of training stage feature sets corresponding to the first images of the pairs of training eye region images and to determine the pretrained scaling and weighting factors of the principal component analysis;

applying a pretrained random forest classifier to the entire feature set to determine a leaf of the pretrained random forest classifier that correlates the feature set to a motion vector field for the eye region of the source image; and warping the eye region of the source image based on the motion vector field and integrating the warped eye region into a remaining portion of the source image to generate an eye contact corrected image.

11. The non-transitory machine readable medium of claim 10, wherein said reducing the histogram of oriented gradient features and said applying the pretrained random forest classifier to the feature set to determine the leaf of the pretrained random forest classifier that correlates the feature set to the motion vector field for the eye region of the source image are selectively provided based on a camera and a display having a first relative position therebetween, the machine readable medium further comprising a plurality of instructions that, in response to being executed on the device, cause the device to, when the camera and the display have a second relative position therebetween, provide eye contact correction by:

reducing the histogram of oriented gradient features to provide a second feature set corresponding to the eye region of the source image;

applying a second pretrained classifier to the second feature set to determine a second motion vector field for the eye region of the source image; and warping the eye region of the source image based on the second motion vector field and integrating the warped eye region into the remaining portion of the source image to generate the eye contact corrected image.

12. The non-transitory machine readable medium of claim 10, wherein the pretrained random forest classifier is generated based on a training stage pretrained classifier trained based on the likelihood maps and the training stage feature sets and compression of the training stage pretrained classifier by parameterized surface fitting to generate the pretrained random forest classifier.

* * * * *